United States Patent
Nagimov

(10) Patent No.: US 12,080,923 B2
(45) Date of Patent: Sep. 3, 2024

(54) GRID-INTERACTIVE CRYOGENIC ENERGY STORAGE SYSTEMS WITH WASTE COLD RECOVERY CAPABILITIES

(71) Applicant: Microsoft Technology Licensing, LLC, Redmond, WA (US)

(72) Inventor: Ruslan Nagimov, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/834,828

(22) Filed: Jun. 7, 2022

(65) Prior Publication Data

US 2023/0395829 A1 Dec. 7, 2023

(51) Int. Cl.
*H01M 8/04082* (2016.01)
*F17C 7/04* (2006.01)
(Continued)

(52) U.S. Cl.
CPC ........... *H01M 8/04208* (2013.01); *F17C 7/04* (2013.01); *H01M 8/04014* (2013.01); *H01M 8/04074* (2013.01); *H01M 8/04723* (2013.01); *F17C 2221/012* (2013.01); *F17C 2223/0161* (2013.01); *F17C 2227/0337* (2013.01); *F17C 2250/032* (2013.01); *F17C 2260/031* (2013.01);
(Continued)

(58) Field of Classification Search
CPC ........................................... F17C 7/04
USPC ............................................ 141/82
See application file for complete search history.

(56) References Cited

U.S. PATENT DOCUMENTS 7,275,569 B2 * 10/2007 Hobbs ................. C01B 3/34
141/82
9,927,067 B2  3/2018  Mann et al.
(Continued)

FOREIGN PATENT DOCUMENTS

CN  111465264 A  7/2020
KR  102373686 B1  3/2022
(Continued)

OTHER PUBLICATIONS

Notardonato, et al., "Zero Boil-Off Methods for Large-Scale Liquid Hydrogen Tanks Using Integrated Refrigeration and Storage", In Journal of IOP Conference Series: Materials Science and Engineering, vol. 278, Jul. 3, 2017, 10 Pages.
(Continued)

*Primary Examiner* — Timothy L Maust
*Assistant Examiner* — Christopher M Afful
(74) *Attorney, Agent, or Firm* — Workman Nydegger

(57) ABSTRACT

An energy storage system comprises at least one cryogen storage device that includes a subcooling loop and that is configurable to store a cryogen with or without boil-off losses. The system also comprises a cryoplant configured to interact with a power source and with the subcooling loop of the at least one cryogen storage device. The system also includes a control system configured to control the interaction of the cryoplant with the power source and the at least one cryogen storage device. The control system is configured to control interaction of the cryoplant with the power source and the at least one cryogen storage device according to a plurality of operational modes, including: a cooling mode, a passive storage mode, a fuel cell backup mode, and a liquefaction mode.

14 Claims, 16 Drawing Sheets

(51) Int. Cl.
*H01M 8/04007* (2016.01)
*H01M 8/04014* (2016.01)
*H01M 8/04701* (2016.01)

(52) U.S. Cl.
CPC . *F17C 2270/0581* (2013.01); *H01M 2250/10* (2013.01)

(56) References Cited

U.S. PATENT DOCUMENTS

| | | |
|---|---|---|
| 10,550,732 B2 | 2/2020 | Bailey et al. |
| 2004/0040316 A1* | 3/2004 | Bradley ................ F17C 11/005 62/46.1 |
| 2004/0126641 A1 | 7/2004 | Pearson et al. |
| 2010/0024445 A1 | 2/2010 | Cichanowicz et al. |
| 2022/0149398 A1* | 5/2022 | Cho .................. H01M 8/04089 |
| 2023/0194160 A1 | 6/2023 | Lagoutte et al. |

FOREIGN PATENT DOCUMENTS

| | | |
|---|---|---|
| WO | 2021118470 A1 | 6/2021 |
| WO | 2021209231 A1 | 10/2021 |

OTHER PUBLICATIONS

Swanger, Adamm., "Large Scale Cryogenic Storage with Active Refrigeration", In the Thesis of Master's in Mechanical Engineering, Oct. 29, 2018, 106 Pages.

"Invitation to Pay Additional Fees Issued in PCT Application No. PCT/US23/018789", Mailed Date: Aug. 9, 2023, 11 Pages.

"International Search Report and Written Opinion Issued in PCT Application No. PCT/US23/018789", Mailed Date: Oct. 4, 2023, 17 Pages.

* cited by examiner

GRID-INTERACTIVE CRYOGENIC ENERGY STORAGE SYSTEMS WITH WASTE COLD RECOVERY CAPABILITIES

BACKGROUND

Technical Field

This disclosure relates to grid-interactive cryogenic energy storage systems and cryogenic energy storage systems with waste cold recovery capability.

Related Technology

Typically, data centers rely on grid power to supply adequate electricity for their operation. Data centers often require a large amount of power to run the servers and/or other computing resources contained in the data centers. Data centers also consume power for other operations, such as for security devices, for emergency response devices (e.g., fire extinguishing devices), and/or for air conditioning units (or other cooling devices) that are used to keep the servers and/or other computing resources at operational temperatures. The power footprint of data centers has steadily increased, driven by growing demand in computational resources and processes.

Data centers are often supported by a backup power system to allow data center operations to persist in the event of power grid disruptions and/or outages. Commensurate with the increased power footprint of data centers, deployment capacities of backup power generation have also needed to increase to maintain a high availability of delivered and demanded power.

Often, data centers (and/or other power-intensive operations) rely on diesel generators to supply backup power when grid power is unavailable or insufficient. Diesel generators require fossil fuels to operate, have a large carbon footprint, and typically generate a lot of undesirable noise. Diesel power generators also require periodic test runs to ensure the generators are operating properly. Grid power also requires fossil fuels to supply electricity. The use of fossil fuels in generating power is a known contributor to climate change. Additionally, grid power is known to fail in extreme temperatures, such as extreme heat or extreme cold.

Cryogenic power generation has been proposed as a potential power backup source. However, cryogens must be stored either at a very high pressure or a very low temperature to maintain the energy density of the cryogen. Further, there is an inherent thermal loss due to leaks in cryogenic insulation which cause stored cryogen to boil off. Many existing liquid cryogen storage tanks have daily evaporative losses of approximately 0.1% to about 0.5%. While these losses are low on a daily scale, backup power generation applications require storing liquid cryogen on a long-term scale (e.g., months to years). Losing liquid cryogen to boil-off losses is undesirable, as generating liquid cryogen is costly, both in terms of the carbon footprint and power consumption.

The subject matter disclosed herein is not limited to embodiments that solve any disadvantages or that operate only in environments such as those described above. Rather, this background is only provided to illustrate one example technology area where some embodiments described herein may be practiced.

SUMMARY

Embodiments of grid-interactive cryogenic energy storage systems with waste cold recovery capabilities are disclosed. In some embodiments, a cryogenic energy storage system includes at least one cryogen storage device, wherein the at least one cryogen storage device includes a subcooling loop and is configurable to store a cryogen with or without boil-off losses. The cryogenic energy storage system may additionally include a cryoplant configured to interact with the subcooling loop of the at least one cryogen storage device and configured to interact with a power source. The cryogenic energy storage system may further include a control system configured to control the interaction of the cryoplant with the power source and the at least one cryogen storage device, wherein the control system is configured to control interaction of the cryoplant with the power source and the at least one cryogen storage device according to a plurality of operational modes. The plurality of operational modes include at least: a cooling mode, a passive storage mode, a fuel cell backup mode, and a liquefaction mode.

Also disclosed are waste cold recuperation systems including at least one cryogen storage device, wherein the at least one cryogen storage device includes a subcooling loop and a cryogen withdrawal port. The waste cold recuperation systems may additionally include a cryoplant configured to interact with the subcooling loop of the at least one cryogen storage device and a control system configured to control the interaction of the cryoplant with the at least one cryogen storage device. The waste cold recuperation systems may further include a fuel delivery path configured to extend from the cryogen withdrawal port to one or more fuel cells, wherein the fuel delivery path is configured to interact with at least one set of thermal energy storage devices to facilitate recovery of waste cold associated with gasification of cryogen withdrawn from the at least one cryogen storage device via the cryogen withdrawal port. In some embodiments, the cryogenic energy storage systems and the waste cold recuperation systems are the same system.

Further disclosed are energy storage systems including at least one cryogen storage device, wherein the at least one cryogen storage device includes a subcooling loop, and is configurable to store a cryogen with or without boil-off losses. The energy storage systems additionally include a cryoplant in communication with the subcooling loop of the at least one cryogen storage device, wherein the cryoplant is configured to interact with a power source. The energy storage systems may further include a control system in communication with the cryoplant and the power source, wherein the control system is configured to control operation of the cryoplant and the power source to selectively activate or selectively deactivate the cryoplant according to at least one of an operational cost metric.

In some embodiments, the operational cost metric includes one or more of a cost of the cryogen, an energy usage for a data center, a cost of electricity, availability of an excess electrical energy, type of available energy, and a cost of boil-off losses. In some embodiments, the control system implements one or more of a plurality of operational modes when one or more aspects of the operational cost metric satisfy one or more operational threshold values.

This summary is provided to introduce a selection of concepts in a simplified form that are further described below in the detailed description. This summary is not intended to identify key features or essential features of the claimed subject matter, nor is it intended to be used as an indication of the scope of the claimed subject matter.

BRIEF DESCRIPTION OF THE DRAWINGS

Various objects, features, characteristics, and advantages of the invention will become apparent and more readily appreciated from the following description of the embodiments, taken in conjunction with the accompanying drawings and the appended claims, all of which form a part of this specification. In the Drawings, like reference numerals may be utilized to designate corresponding or similar parts in the various Figures, and the various elements depicted are not necessarily drawn to scale, wherein:

DETAILED DESCRIPTION

Figure 1A:
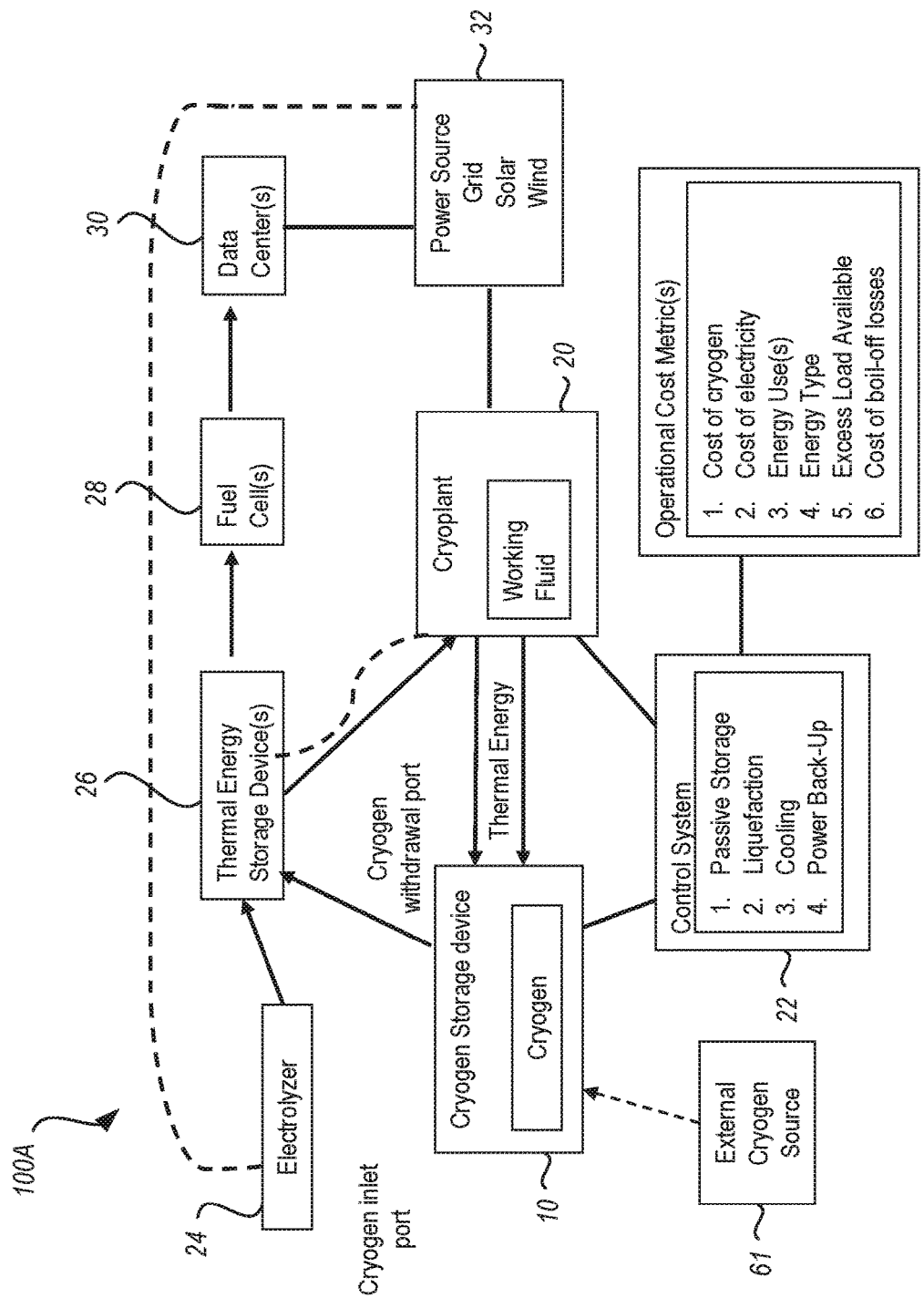
FIG. 1A illustrates a schematic overview of an example grid-interactive cryogenic energy storage system with waste cold recovery capabilities.

Embodiments of grid-interactive cryogenic energy storage systems with waste cold recovery capabilities are disclosed. In some embodiments, a cryogenic energy storage system includes at least one cryogen storage device, wherein the at least one cryogen storage device includes a subcooling loop and is configurable to store a cryogen with or without boil-off losses. The cryogenic energy storage system may additionally include a cryoplant configured to interact with the subcooling loop of the at least one cryogen storage device and configured to interact with a power source. The cryogenic energy storage system may further include a control system configured to control the interaction of the cryoplant with the power source and the at least one cryogen storage device, wherein the control system is configured to control interaction of the cryoplant with the power source and the at least one cryogen storage device according to a plurality of operational modes. The plurality of operational modes include at least: a cooling mode, a passive storage mode, a fuel cell backup mode, and a liquefaction mode.

In some embodiments, the cooling mode includes or involves interaction of the cryoplant and the at least one cryogen storage device. The interaction may include cycling working fluid through the cryoplant and the subcooling loop of the at least one cryogen storage device to facilitate cooling of cryogen stored within the at least one cryogen storage device. Facilitating cooling of the stored cryogen includes causing densification or subcooling of the cryogen to store thermal energy within the at least one cryogen storage device. Densification or subcooling of the cryogen enables storage of the cryogen within the at least one cryogen storage device without boil-off losses for at least a time period associated with the passive storage mode.

In some embodiments, the cryoplant is not operated during the passive storage mode. In some embodiments, the fuel cell backup mode involves an interaction of the at least one cryogen storage device, the cryoplant, and one or more fuel cells. In some embodiments, the interaction between the at least one cryogen storage device, the cryoplant, and one or more fuel cells includes drawing the cryogen from a cryogen withdrawal port of the at least one cryogen storage device and delivering the withdrawn cryogen to the one or more fuel cells. The cryogen is delivered along a fuel delivery path that extends from the cryogen withdrawal port toward the one or more fuel cells. In some embodiments, gasification of the withdrawn cryogen occurs along the fuel delivery path. At least some of the waste cold associated with gasification of the cryogen is recovered by the cryoplant.

In some embodiments, the liquefaction mode includes delivering gaseous cryogen pre-cursor to the at least one cryogen storage device via a cryogen inlet port of the at least one cryogen storage device. The liquefaction mode may also include cycling working fluid through the cryoplant and the subcooling loop of the at least one cryogen storage device to facilitate liquefaction of the gaseous cryogen pre-cursor within the at least one cryogen storage device.

Also disclosed are waste cold recuperation systems including at least one cryogen storage device, wherein the at least one cryogen storage device includes a subcooling loop and a cryogen withdrawal port. The waste cold recuperation systems may additionally include a cryoplant configured to interact with the subcooling loop of the at least one cryogen storage device and a control system configured to control the interaction of the cryoplant with the at least one cryogen storage device. The waste cold recuperation systems may further include a fuel delivery path configured to extend from the cryogen withdrawal port to one or more fuel cells. The fuel delivery path is configured to interact with at least one set of thermal energy storage devices to facilitate recovery of waste cold associated with gasification of cryogen withdrawn from the at least one cryogen storage device via the cryogen withdrawal port. In some embodiments, the cryogenic energy storage systems and the waste cold recuperation systems are the same system.

In some embodiments, the at least one set of thermal energy storage devices include a plurality of elements configured to store waste cold associated with the gasification of the cryogen. In some embodiments, the at least one set of thermal energy storage devices include one or more heat exchangers of the cryoplant which may be configured to facilitate transfer of waste cold associated with the gasification of the cryogen to the cryoplant.

Further disclosed are energy storage systems including at least one cryogen storage device, wherein the at least one cryogen storage device includes a subcooling loop, and is configurable to store a cryogen with or without boil-off losses. The energy storage systems additionally include a cryoplant in communication with the subcooling loop of the at least one cryogen storage device, wherein the cryoplant is configured to interact with a power source. The energy storage systems may further include a control system in communication with the cryoplant and the power source, wherein the control system is configured to control operation of the cryoplant and the power source to selectively activate or selectively deactivate the cryoplant according to at least one of an operational cost metric.

In some embodiments, the operational cost metric includes one or more of a cost of the cryogen, an energy usage for a data center, a cost of electricity, availability of an excess electrical energy, type of available energy, and a cost of boil-off losses. In some embodiments, the control system implements one or more of a plurality of operational modes (e.g., a liquefaction mode) when one or more aspects of the operational cost metric satisfy one or more operational threshold values (e.g., when the cost of grid power is sufficiently low or negative, or when data center power usage may not satisfy a minimum power consumption threshold, when excess renewable energy is available, etc.).

Benefits, Advantages and Technical Solutions

The disclosed grid-interactive cryogenic energy storage systems with waste cold recovery capabilities can provide a number of benefits, advantages and technical solutions.

Initially, at least some of the cryogen storage devices incorporated into cryogenic energy storage systems may include a subcooling loop to cool and/or liquefy stored cryogen. The subcooling loop may be used to further densify the stored cryogen into ice and/or slush. Creation of the icy and/or slushy cryogen may enable virtual energy storage within the cryogen itself in the form of thermal energy, thereby increasing the overall energy storage capacity of the cryogenic energy storage system(s). In some instances, cryogen densification can increase cryogenic energy storage system capacity by about 7%. This increased energy storage facilitated by cryogen densification may enable at least some of the disclosed systems to store cryogen for a time without boil-off losses, even without operation of active cooling systems (e.g., cryoplants).

At least some of the disclosed cryogenic energy storage systems incorporate smart control systems that enable intelligent use of available power and/or electricity. For example, the control systems may intelligently draw power from a grid when grid electricity is cheap and/or there is an excess of grid electricity available. Additionally, and/or alternatively, the control systems may tailor use of grid power based on the availability of power from renewable sources, such as solar and/or wind power sources. The control systems may determine which of a plurality of operational modes to implement and/or when to implement such operational modes according to at least one operational cost metric.

The operational cost metric may include, among other things, one or more of a cost of the cryogen, an energy usage for a data center, a cost of electricity, availability of an excess electrical energy, type of available energy, and a cost of boil-off losses. For example, when assessing a cost of electricity and/or the type of available energy, the control systems may intelligently include a prediction or forecasting capability. For example, the control systems may have access to weather data and/or weather forecasts. The control systems may intelligently incorporate the weather data and/or forecasts to determine availability of renewable energy from, for example, solar panel systems. When solar power is available and/or abundant, the control systems may select operational modes in an opportunistic manner, such as by subcooling the cryogen in a manner that causes densification or by performing cryogen liquefaction.

In some instances, the disclosed systems are connected to one or more dedicated renewable energy sources, such as solar or wind power systems. In some implementations, the control system is configured to intelligently implement a switch from drawing grid power to drawing power from dedicated renewable energy sources. The control system may additionally or alternatively be configured to intelligently supplement grid power with dedicated renewable power based upon availability of the renewable power. At least some of the operational modes discussed herein may be implemented utilizing dedicated renewable power in addition to or as an alternative to grid power. By enabling the utilization of renewable energy sources, the smart control systems may beneficially cut down on carbon emissions.

The disclosed cryogenic energy storage systems may also beneficially reduce the need for diesel back-up power generators. Specifically, at least some of the disclosed cryogenic energy storage systems are capable of implementing a plurality of operational modes, such as a power back-up mode. The power back-up mode utilizes fuel cells to produce required energy. The fuel cells utilize energy-dense resources, such as cryogen, rather than diesel. The incorporation of fuel cells as power backups in the disclosed cryogenic energy storage systems can beneficially enable a smooth transition to backup power sources when grid power is, or suddenly becomes, unavailable. The incorporation of fuel cells as power backups can also beneficially reduce or eliminate noise typically associated with diesel power generators.

The disclosed cryogenic energy storage systems can enable reduction of carbon emissions of, for example, data centers. Because data centers typically operate a large number of servers and can require air conditioning to maintain a proper temperature of the servers, data centers can easily consume lots of power. Because at least some of the disclosed cryogenic energy storage systems are capable of switching between renewable sources and grid power, the carbon emissions associated with data centers may be reduced.

Additionally, at least some of the disclosed cryogenic energy storage systems are capable of recovering waste cold (discussed more fully below) which can improve operational efficiency associated with disclosed cryogenic energy storage systems (and/or any data center apparatuses, such as by transferring the recovered waste cold toward server systems to improve server cooling, which may lower the energy demand of air conditioners typically used with data centers). Waste cold may be recovered, for example, during a power backup operational mode. During the power backup operational mode, cryogen may be gasified and transferred from a cryogen storage device toward one or more fuel cells. The one or more fuel cells may be used to provide power to other components of the system. Additionally, and/or alternatively, the one or more fuel cells may be used to provide power to data centers. During gasification, the cryogen may release cold thermal energy. This released cold thermal energy may be recovered by the disclosed systems and used by other components of the system and/or data centers.

At least some of the disclosed cryogenic energy storage systems may include a cryogen storage device which, beneficially, may be configurable to allow for boil-off losses of stored cryogen. A cost of boil-off losses may be an operational metric analyzed by the control systems in determining which of a plurality of operational modes to run and/or which power sources to draw energy from. When the cost of boil-off losses is lower than, for example, the cost of cryogen and/or the cost of electricity, the control systems may configure the cryogen storage devices to allow for boil-off losses with replenishment of the cryogen at a later time. Additionally, and/or alternatively, the cryogen storage devices may be configured for zero boil-off losses, decreasing the cost of replenishing the cryogen and increasing the long-term availability of backup power.

Cryogenic Energy Storage Systems

Figure 1B:
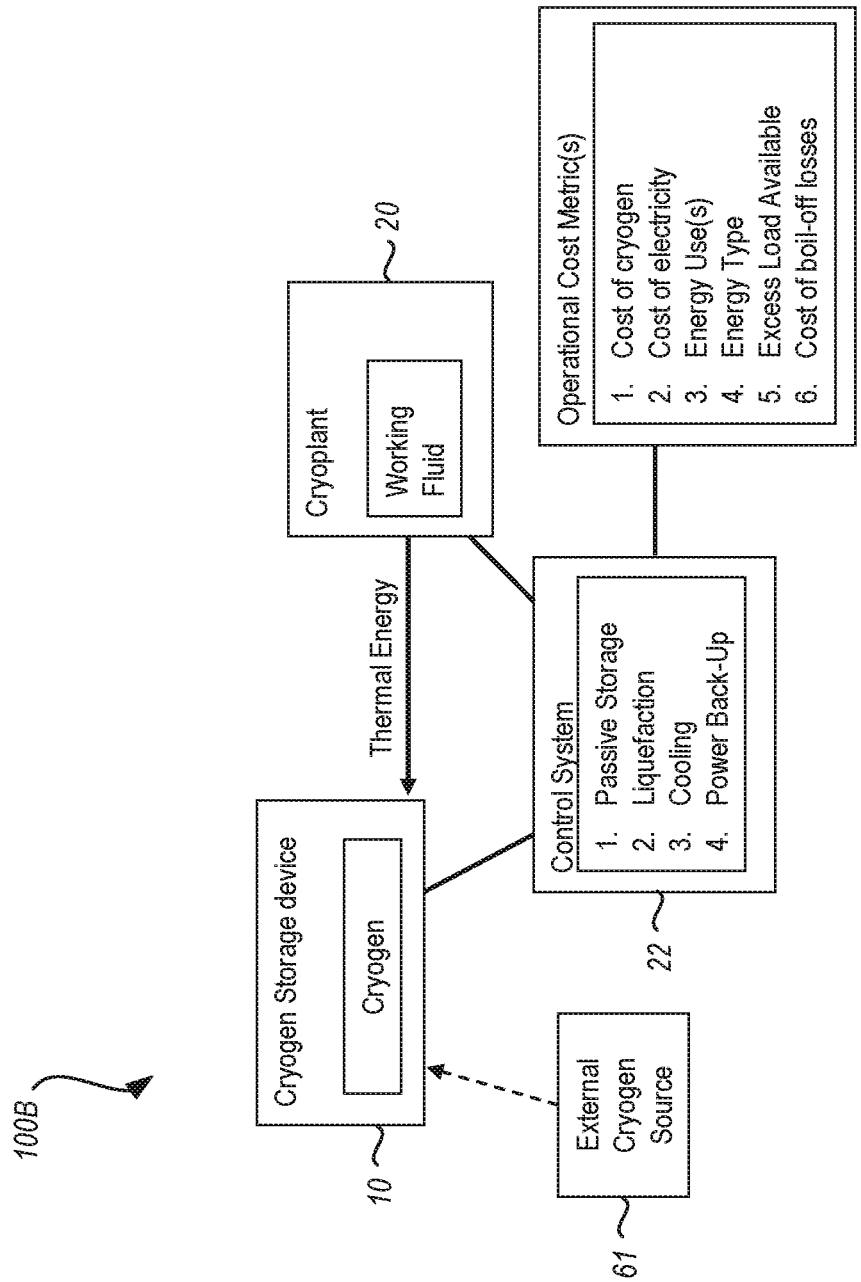
FIG. 1B illustrates a schematic overview of another example cryogenic energy storage system.
Figure 1C:
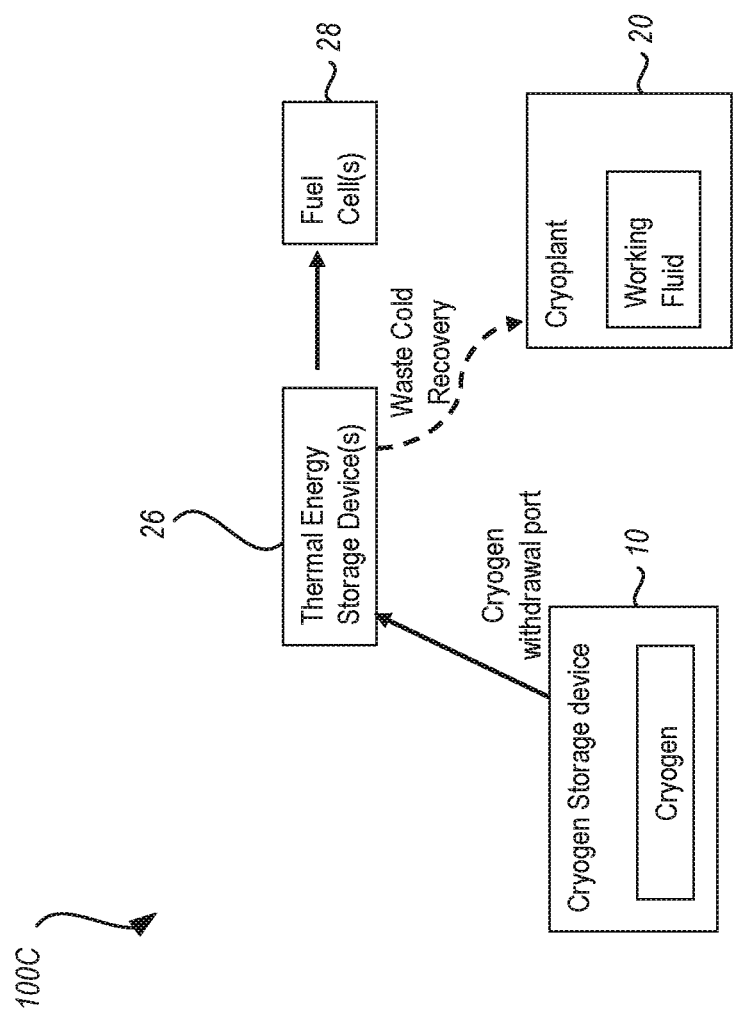
FIG. 1C illustrates a schematic overview of the waste cold recovery capabilities of a cryogenic energy storage system.

At least some disclosed embodiments include cryogenic energy storage systems that are grid interactive and/or capable of recovering waste cold. FIGS. 1A-1C illustrate schematic overviews of example cryogenic energy storage systems. FIG. 1A illustrates a schematic representation of a cryogenic energy storage system 100A that is configured to interact with a power source. The illustrated grid-interactive energy storage system 100A includes at least one cryogen storage device at least one cryoplant 20, a control system 22 and a power source 32. In the example of FIG. 1A, the control system 22 is in communication with both the at least one cryogen storage device 10 and the cryoplant 20. The cryoplant 20 receives power from the power source 32. The power source may include grid power, solar power and/or wind power, and/or other types. The cryogen storage device 10 may be configured to receive cryogen from an external source 61 (e.g., cryogen may be delivered via shipping channels, via pipeline, etc.).

The at least one cryogen storage device 10 is configured to hold and store cryogen (discussed more fully below with respect to FIG. 2). Cryogens comprise substances usable for low-temperature applications. Cryogens may comprise liquids or compressed gases. For instance, a cryogen may comprise air, nitrogen, helium, methane, hydrogen, oxygen, natural gas, and/or others. A cryoplant comprises a system configured to facilitate cooling of environments, objects, and/or any matter. For instance, a cryoplant may provide cooling by circulating a working fluid through a loop. A cryoplant may be configured to facilitate cooling via performance of one or more cryogenic cycles, such as, by way of non-limiting example, a Joule-Thomson cycle, a Linde cycle, a reverse Brayton cycle, a Claude cycle, a cascade cycle, and/or others. In the example of FIG. 1A, the cryoplant 20 circulates the working fluid, which is periodically warmed up to form a warmer liquid, liquid/vapor mixture, or warmer gas and then cooled down to form a colder liquid, liquid/vapor mixture, or colder gas. Cooling of the working fluid may provide a low temperature liquid, liquid/vapor mixture, or gas usable to cool target matter or a target environment (e.g., cryogen within the cryogen storage device 10). The working fluid increases in temperature and/or enthalpy and may evaporate during cooling of the target matter/environment, after which the working fluid (e.g., now gasified) is re-cooled and/or re-condensed to provide a colder liquid, liquid/vapor mixture, or colder gas. The re-cooled working fluid can be subsequently used to facilitate cooling the target matter/environment through another cycle. The cold produced via operation of the cryoplant 20 can be immediately used (e.g., to cool the cryogen within the cryogen storage device 10) or it can be stored for later use (e.g., in one or more thermal energy storage devices).

In some embodiments, the cryogenic energy storage system 100A includes (or is in communication with) an electrolyzer 24, one or more sets of thermal energy storage devices 26, one or more fuel cells 28, and/or one or more data centers 30. In some instances, as shown in FIG. 1A, the cryogenic energy storage system 100A includes, or is in communication with, one or more external sources of cryogen 61. The one or more data centers 30 may receive power from the power source 32. Additionally, and/or alternatively, the one or more data centers 30 may receive power from the one or more fuel cells 28. For example, the one or more data centers 30 may receive power from the one or more fuel cells 28 when power from the power source 32 is unavailable or unreliable.

The components of a cryogenic energy storage system (e.g., cryogenic energy storage system 100A, 100B, 100C, etc.) may interact with one another in various ways, and, in some instances, such interactions are at least partially controlled by the control system 22. For example, in some embodiments, the electrolyzer 24 delivers gaseous cryogen (or gaseous cryogen pre-cursor) to the at least one cryogen storage device 10. The electrolyzer 24 may be powered by the power source 32 (as indicated in FIG. 1A by the dashed line extending from the electrolyzer 24 to the power source 32). The gaseous cryogen may be delivered to the at least one cryogen storage device 10 via a fuel delivery path and/or via a cryogen inlet or fill port. The delivered gaseous cryogen may be liquefied and/or cooled for storage in the at least one cryogen storage device 10. The gaseous cryogen may be cooled, liquified, and/or densified within the cryogen storage device 10 via operation of the cryoplant 20. In some instances, the gaseous cryogen is initially cooled prior to entry into the cryogen storage device 10 by being routed in thermal communication with the thermal energy storage device(s) 26, which can be cooled via operation of the cryoplant 20 (as indicated in FIG. 1A by the arrows extending from the electrolyzer 24 to the thermal energy storage device(s) 26, from the thermal energy storage device(s) 26 to the cryoplant 20, and from the cryoplant 20 to the cryogen storage device(s) 10). In some instances, the thermal energy storage device(s) 26 are part of the cryoplant 20 (e.g., the thermal energy storage device(s) 26 may comprise one or more heat exchangers of the cryoplant 20, as indicated by the dashed line extending from the thermal energy storage device(s) 26 to the cryoplant 20 in FIG. 1A). The cryogen may be stored in the at least one cryogen storage device 10 for days, weeks, months and/or years. Although the present example focuses on an electrolyzer for providing a gaseous cryogen or gaseous cryogen pre-cursor, other devices may be utilized in accordance with the present disclosure.

As noted above, in some embodiments, the control system 22 may be configured to control an interaction between the cryoplant 20 and the power source 32, such as to control selective operation or running of the cryoplant 20. Additionally, and/or alternatively, the control system 22 is configured to control an interaction between the cryoplant 20 and the at least one cryogen storage device 10 (e.g., to control valves or ports of the cryogen storage devices 10 in accordance with various operational modes).

In some embodiments, the control system 22 controls the interactions of the cryoplant 20 and the power source 32, and/or the at least one cryogen storage device 10, according to a plurality of operational modes. The plurality of operational modes may include, by way of non-limiting example, passive storage, liquefaction, cooling, and power back-up. Additional details related to actions and/or processes associated with the various operational modes are provided herein. At least some of the actions and/or processes associated with the various operational modes involve interactions among various components of a cryogenic energy storage system, such as the cryoplant 20, the cryogenic energy storage device 10, the electrolyzer 24, the power source 32, the fuel cell(s) 28, the thermal energy storage device(s) 26, etc. The control system 22 may control the various components of the cryogenic energy storage system (and/or interactions among the various components) to implement the various operational modes.

In the example of FIG. 1A, the control system 22 is configured to implement one or more of the plurality of operational modes according to one or more operational cost metrics. In some embodiments, the operational cost metrics include: a cost of cryogen; a cost of electricity; energy uses (e.g., energy use of the data center 30); a type of energy (e.g., solar, wind, grid, etc.); the availability of excess energy from the grid; and a cost of boil-off losses. For example, the control system 22 may activate the liquefaction mode (triggering operation of the electrolyzer 24 to provide gaseous hydrogen to the cryogen storage device 10 and operation of the cryoplant to liquefy the gaseous hydrogen within the cryogen storage devices) based upon the cost of cryogen (e.g., responsive to determining that the cost of obtaining/shipping replacement cryogen is high or will be high), the cost of electricity (e.g., responsive to determining that the cost of electricity is low or negative or is expected to increase), energy use(s) (e.g., responsive to determining that data center(s) 30 require or will require lower than nominal power), energy type (e.g., responsive to determining that solar power is available), excess energy available (e.g., excess energy in the grid, such as excess solar energy during peak solar hours), etc.

As another example, the control system 22 may activate the cooling mode to cause operation of the cryoplant 20 to subcool and/or densify the cryogen within the cryogen storage device 10 based upon anticipated increased cost of electricity during peak hours (e.g., to enable the cryogen to be stored within the cryogen storage device 10 without boil-off losses during the peak hours despite non-operation of the cryoplant 20) and/or based upon the cost of boil-off losses relative to the cost of electricity for operating the cryoplant during peak hours. As yet another example, the control system 22 may implement the passive storage mode based upon a high cost of electricity and/or a low cost of boil-off losses and/or a low cost of cryogen (e.g., replacement cryogen). The operational cost metric(s) may be considered singly or in combination in various ways by the control system 22 to determine which operational mode to implement, in accordance with the present disclosure.

Although FIG. 1A illustrates the control system 22 as a single entity, one will appreciate, in view of the present disclosure, that a control system 22 may comprise any number of control components, which may interact with one another (and/or other entities) to carry out control system functionality as disclosed herein. For example, a control system 22 may be at least partially distributed among various components of a cryogenic energy storage system (e.g., crypolant, cryogenic storage device, electrolyzer, power source, fuel cell(s), etc.).

FIG. 1B illustrates another schematic overview of the cryogenic energy storage system 100B. As illustrated in the example of FIG. 1B, the cryogenic energy storage system 100B includes at least one cryogen storage device 10, at least one external source of cryogen 61, at least one cryoplant 20, and a control system 22. Working fluid circulates through the cryoplant 20 and is periodically warmed up and cooled down. The control system 22 is in communication with both the at least one cryogen storage device 10 and the cryoplant 20. In some embodiments, the control system 22 controls an interaction between the cryoplant 20 and the at least one cryogen storage device 10. The control system 22 may control the interaction between the cryoplant 20 and the at least one cryogen storage device 10 according to the plurality of operational modes and/or at least one operational cost metric.

FIG. 1C illustrates a schematic overview of waste cold recovery capabilities of the cryogenic energy storage system 100C. Waste cold, as used herein, refers to cold (e.g., thermal energy) produced upon warming up of a cryogen pursuant to use of the cryogen in association with fuel cells. For example, waste cold can be generated during gasification of a cryogen preparatory to use of the gasified cryogen in fuel cells (e.g., to power data center(s) 30). Waste cold is typically lost (or wasted) to an external environment (e.g., ambient air or water).

At least some disclosed cryogenic energy storage systems have the capability to recover at least some of this waste cold. For example, in the example of FIG. 1C, stored liquid cryogen is withdrawn from the at least one cryogen storage device 10 via a cryogen withdrawal port. The cryogen is delivered to one or more fuel cells 28 via a fuel delivery path. The fuel delivery path is configured to interact and be in thermal communication with one or more sets of thermal energy storage devices 26. The thermal energy storage devices 26 may be, for example, a plurality of solid components (e.g., dense and/or porous metallic and/or non-metallic structures), and/or utilize liquid or gaseous thermal energy storage media (e.g. fluids with phase transition properties). In some instances, one or more heat exchangers of the cryoplant 20 may function as the thermal energy storage device(s) configured to facilitate waste cold recovery.

As the cryogen is delivered to the one or more fuel cells 28 via the fuel delivery path, the cryogen is gasified. Upon gasification of the cryogen, waste cold is produced. The one or more sets of thermal energy storage devices are configured to capture and recover this waste cold. For example, the thermal energy storage devices 26 may be, for example, a plurality of elements that absorb and retain the cold energy. Additionally, and/or alternatively, the thermal energy storage devices 26 may be, for example, heat exchangers of the cryoplant 20. The heat exchangers of the cryoplant may facilitate retention of the recovered waste cold for the cryoplant 20. For instance, when the cryoplant 20 is subsequently operated, the cryoplant 20 may be more efficient due to the recovered waste cold. For example, in some instances, subsequent to waste cold recovery, the cryoplant 20 may be regarded as "pre-cooled," thereby requiring less input power or work to initially bring the working fluid to a desired state and/or temperature to facilitate cooling (e.g., cooling of the cryogen within the cryogen storage device 10). Such functionality may enable the cryoplant to be run for a shorter period of time while still achieving the same amount of cooling, thus further decreasing the power consumption of the cryoplant 20.

The devices/systems shown in FIGS. 1A-1C may comprise various additional components or subcomponents, at least some of which will be described in more detail hereinafter (e.g., storage devices, processors, sensors, valves, etc.).

Figure 2:
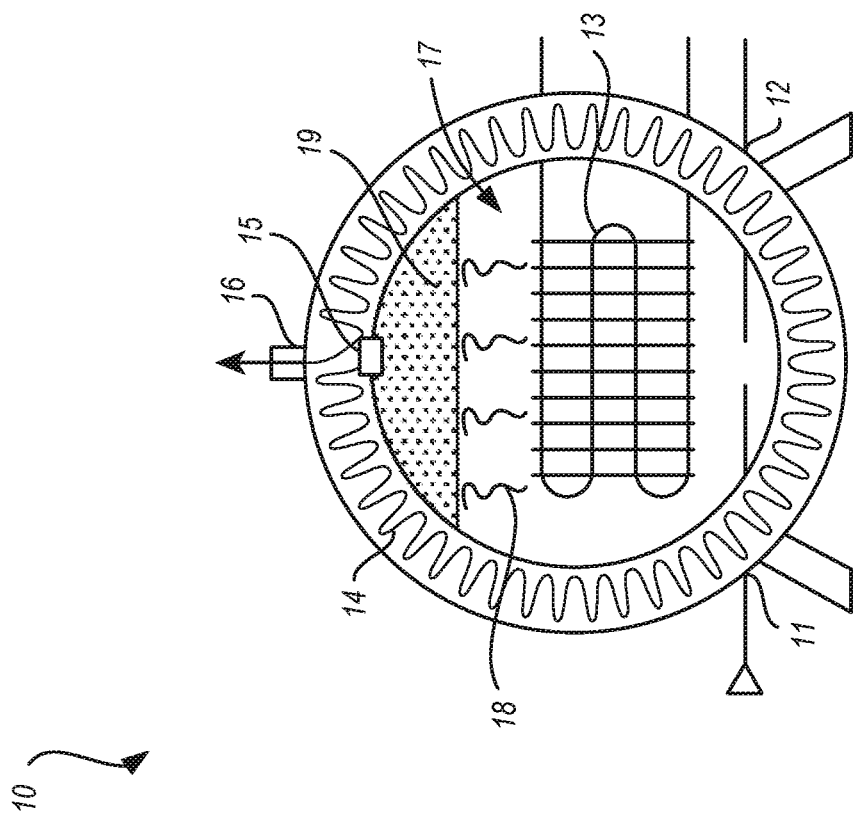
FIG. 2 illustrates an example cryogen storage device.

FIG. 2 illustrates an example schematic representation of a cryogen storage device 10 to be used in a cryogenic energy storage system, such as the systems 100A-100C illustrated in FIGS. 1A-1C. In the example of FIG. 2, the cryogen storage device 10 includes a cryogen inlet or fill port 11, a cryogen exit or withdrawal port 12, a subcooling loop 13, a gaseous vent 16 and an internal storage tank 17. In the example of FIG. 2, a vapor path 14 extends from a cold vapor vent 15 connected to the internal storage tank 17 to the gaseous vent 16 that is exposed to the surrounding environment. The vapor path 14 can allow the cryogen storage device 10 to retain cold associated with cryogen boil-off for an extended period of time (e.g., as opposed to immediately venting cryogen boil-off to the surrounding environment). The cryogen storage device 10 stores liquid cryogen 18 and gaseous or vapor cryogen 19. The cryogen storage device 10 is configurable to store the liquid and gaseous cryogen 18, 19 with or without boil-off losses.

As used herein, boil-off losses refer to cryogen that evaporates and is lost to an external environment (i.e., external to the cryogen storage device 10) due to the warming up and gasification of liquid cryogen. As cryogenic liquids must be kept at extremely low temperatures (e.g., around or below −150° C.) boil-off losses often result from heat transfer from the ambient environment into the cryogen storage devices 10. Occasionally, a cost of boil-off losses is low compared to a cost of running a cryogenic energy storage system (e.g., during peak grid energy usage/cost hours). In such case, the cryogen storage device 10 may be configured to allow for at least some boil-off loss of the stored liquid cryogen (e.g., via the control system 22 refraining from causing cycling the cryoplant 20). Additionally, and/or alternatively, when a cost of replacing cryogen is high relative to the cost of cooling existing cryogen, the cryogen storage device 10 can be configured to eliminate boil-off losses as a zero boil-off loss cryogen storage device 10 (e.g., via the control system 22 causing cycling of the cryoplant).

The subcooling loop 13 is configured to enable transfer of heat from cryogen within the internal storage tank 17 (whether liquid 18 or gas 19) to a working fluid cycling through the subcooling loop 13, thereby cooling the cryogen within the internal storage tank 17. The working fluid cycling through the subcooling loop 13 may be part of a different fluid circuit or part of the same fluid circuit as the working fluid of the cryoplant 20. In some instances, one or more heat exchangers intervene between separate fluid circuits of the subcooling loop 13 and the cryoplant 20 to facilitate heat transfer from the subcooling loop 13 to the cryoplant 20. The one or more heat exchangers may be part of the subcooling loop 13 and/or part of the cryoplant 20. The subcooling loop 13 may thus enable liquification and/or densification of cryogen stored in the cryogen storage device 10. For example, when gaseous cryogen 19 is delivered to the cryogen storage device 10 (e.g., via the cryogen inlet port 11), the subcooling loop 13 may liquify the gaseous cryogen 19 to form liquid cryogen 18. In some embodiments, the subcooling loop 13 enables densification of liquid cryogen to create a "slushy" or at least partially solid cryogen within the cryogen storage device 10 (e.g., thereby storing thermal energy within the cryogen itself and enabling storage of the cryogen without boiloff losses, even during non-operation of the cryoplant 20, for at least a period of time).

Figure 3:
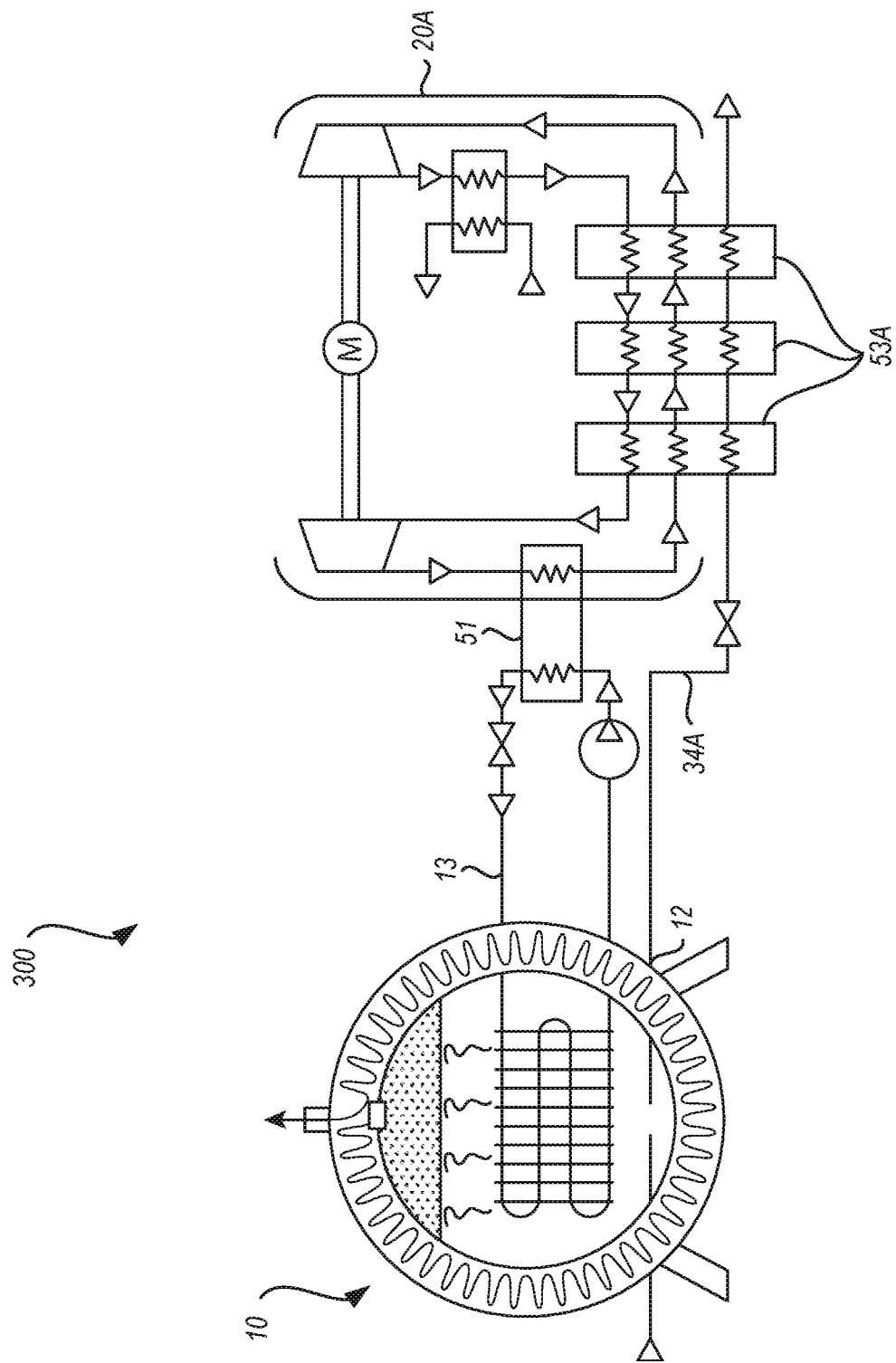
FIG. 3 illustrates an example cryogenic energy storage system.

FIG. 3 illustrates an example cryogenic energy storage system 300. Similar to the cryogenic energy storage systems 100A-100C of FIGS. 1A-1C, the cryogenic energy storage system 300 includes at least one cryogen storage device 10 and a cryoplant 20A (conceptually corresponding to the cryoplant 20 discussed hereinabove). In the example of FIG. 3, the cryoplant 20A is a reverse turbo-Brayton-type cryoplant, though other types of cryoplants may be utilized in accordance with the present disclosure. The cryoplant 20A is in thermal communication with the subcooling loop 13 of the cryogen storage device 10. For example, the cryoplant 20A may be in thermal communication with the subcooling loop 13 via one or more heat exchangers 51, which facilitate the transfer of heat from the subcooling loop 13 to the cryoplant 20A. The cryoplant 20A receives power from a power source (such as power source 32 and/or fuel cell(s) 28 illustrated in FIGS. 1A-1C).

Also illustrated in FIG. 3 is a fuel delivery path 34A, which extends from the cryogen exit or withdrawal port 12. The fuel delivery path 34A may extend to, for example, one or more fuel cells (see, for example, FIGS. 1A, 1C, 7, and 11). Cryogen may gasify along the fuel delivery path 34A toward the one or more fuel cells to enable the fuel cell(s) to generate power (e.g., to power the data center(s) 30 and/or cryoplant 20A). The fuel delivery path 34A may be in thermal communication with one or more sets of thermal energy storage devices. In some embodiments, the one or more sets of thermal energy storage devices may be a plurality of elements that are configured to hold and/or store thermal energy. As a non-limiting example, the plurality of elements may be metal blocks or heat exchangers that are configured to absorb and/or store cold thermal energy pursuant to a waste cold recuperation process. As another example, the one or more sets of thermal energy storage devices may be implemented as one or more gravel beds. In some instances, the one or more thermal storage devices in communication with the fuel delivery path 34A comprise a set of heat exchangers 53A of the cryoplant 20A, such that waste cold generated by gasification of cryogen through the fuel delivery path 34A is recovered by the set of heat exchangers 53A of the cryoplant 20A to improve operational efficiency of the cryoplant 20A (as discussed hereinabove with reference to FIG. 1C).

Figure 4:
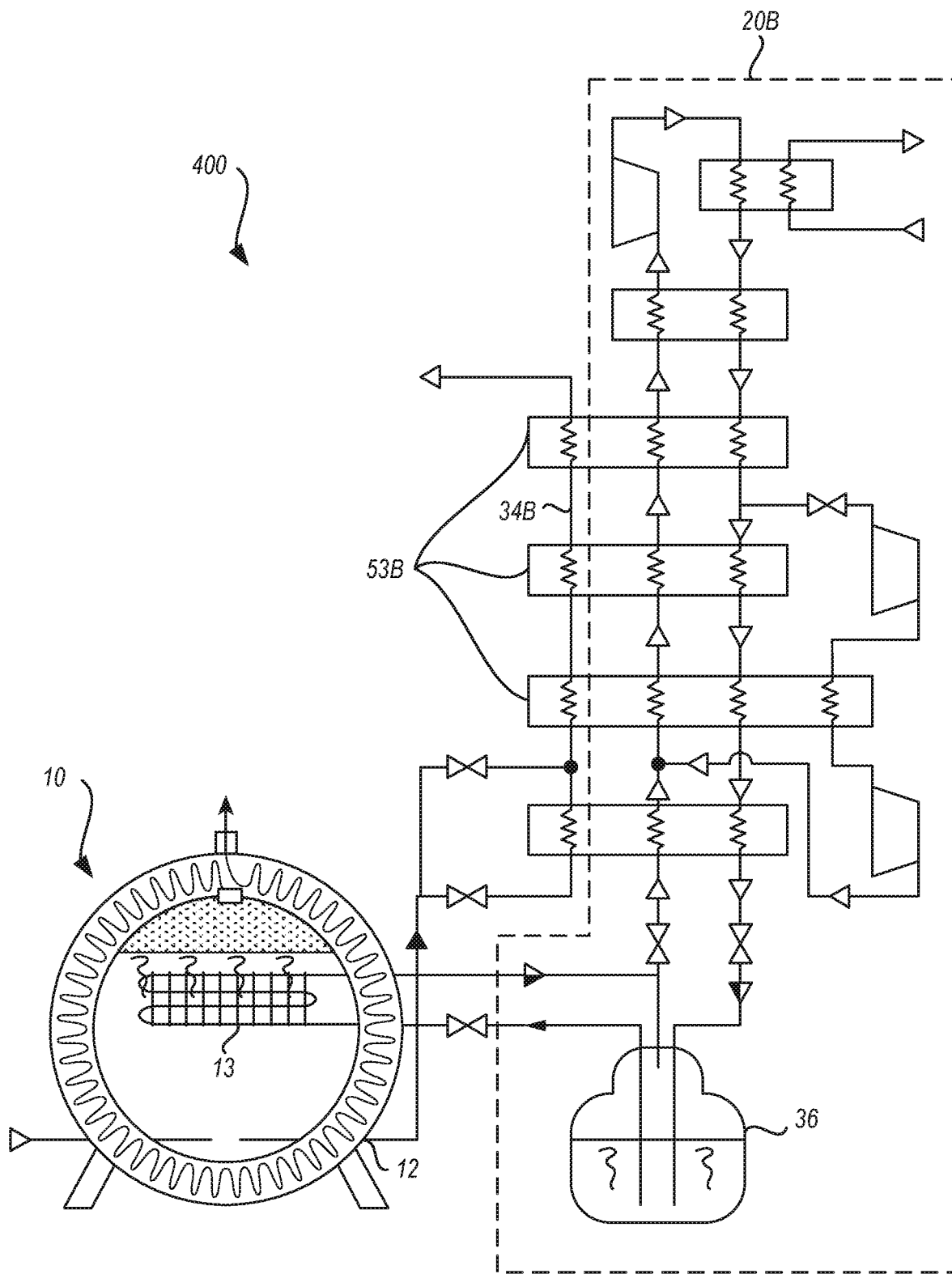
FIG. 4 illustrates another example cryogenic energy storage system.

FIG. 4 illustrates another example cryogenic energy storage system 400. The cryogenic energy storage system 400 conceptually corresponds to the cryogenic energy storage system 300 of FIG. 3, although the cryogenic energy storage system 400 implements a different type of cryoplant 20B. As illustrated in the example of FIG. 4, the cryoplant 20B is a Claude liquefaction-type cryoplant, though other types of cryoplants may be utilized. The cryoplant 20B may additionally include a working fluid dewar 36. The working fluid dewar 36 may comprise working fluid to be cycled through the cryoplant 20B in producing cooling. The cryoplant 20B is in direct fluid communication with the subcooling loop 13 of the cryogen storage device 10. The cryoplant 20B receives power from a power source (such as power source 32 and/or fuel cell(s) 28 illustrated in FIGS. 1A-1C).

The cryogenic energy storage system 400 also includes a fuel delivery path 34B, which extends from the cryogen exit or withdrawal port 12 toward one or more fuel cells. The fuel delivery path 34B interacts with heat exchangers 53B of the cryoplant 20B to facilitate recovery by the cryoplant 20B of waste cold generated by gasification of cryogen traveling toward the one or more fuel cells via the fuel delivery path 34B.

Any cryogen may be utilized in association with the disclosed cryogenic energy storage systems such as, by way of non-limiting example air, nitrogen, methane, hydrogen, oxygen, natural gas, combinations thereof, and/or others.

Operational Modes

Figure 5:
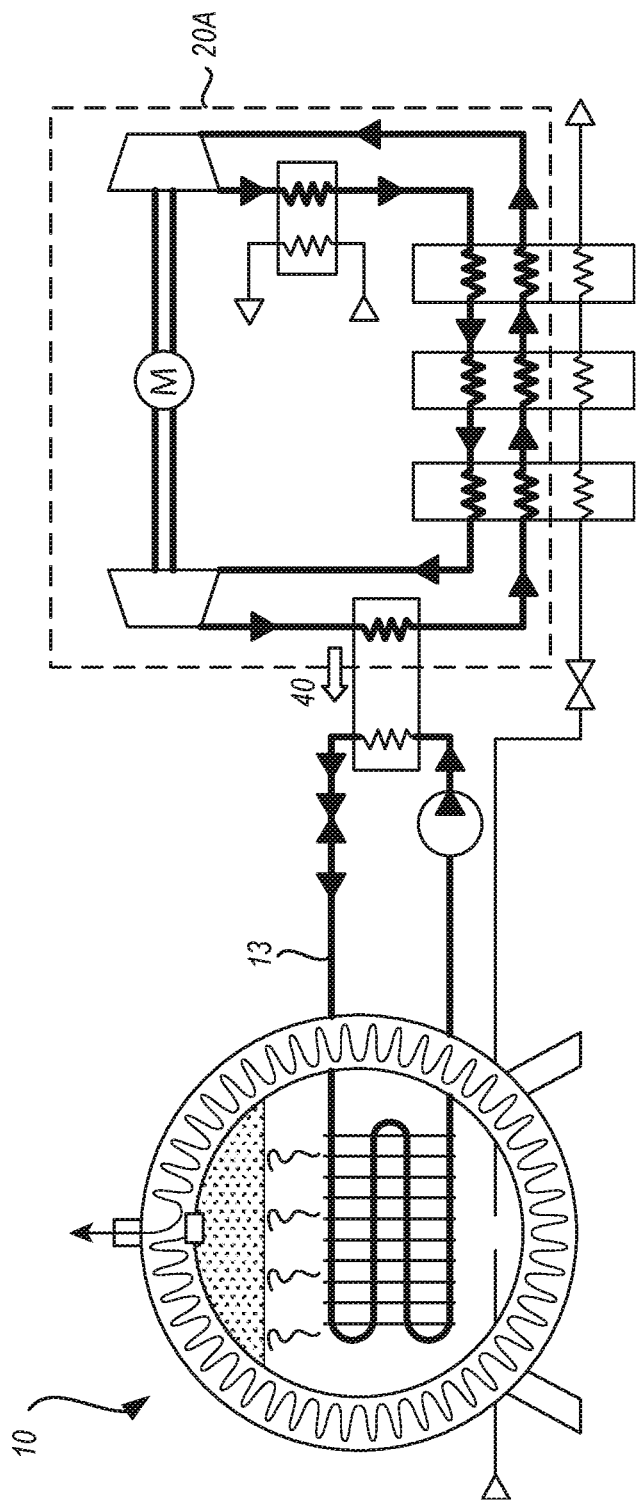
FIG. 5 illustrates an example cooling operational mode of a cryogenic energy storage system.

FIG. 5 illustrates an example cooling operational mode of a cryogenic energy storage system. As illustrated, the cryoplant 20A is a reverse Brayton-turbo cycle. The cryoplant 20A circulates working fluid through the cryoplant 20A in a cooling process. Working fluid also cycles through the subcooling loop 13 shown in FIG. 5. The cycling of fluid is indicated in FIG. 5 with bolded lines. The cycling of the working fluid through the cryoplant 20A and the cooling loop 13 facilitates active cooling of the subcooling loop 13 by the cryoplant 20A (depicted using block arrow 40), which in turn causes cooling, liquefying, and/or densifying of cryogen within the cryogen storage device 10.

The cryoplant 20A may receive power from a power source 32, such as that illustrated in FIG. 1A. The power source 32 may be grid power or one or more dedicated renewable energy sources. Whether the cryoplant 20A is powered by grid power or one or more dedicated renewable energy sources may be determined by the control system 22. For example, when grid power is cheap (e.g., at night), the cryoplant 20A may draw power from the grid to facilitate cryogen cooling. This cheap power may be "stored" in the tank due to the liquification and/or densification facilitated by the subcooling loop 13 and the cryoplant 20A.

In some instances, as the subcooling loop 13 densities liquid cryogen stored in the cryogen storage device 10, the liquid cryogen may become slush and/or ice, thereby allowing "virtual" storage of additional thermal energy within the cryogen itself. In some instances, densifying the liquid cryogen in such a manner increases the energy storage capacity of the cryogen storage device 10, such as by up to 1%, up to 2%, up to 3%, up to 4%, up to 5%, up to 6%, up to 7%, up to 8%, up to 9%, up to 10%, or by any amount. In at least one example, cryogen densification can increase the energy storage capacity of a cryogen storage device by about 7%, as demonstrated by the example calculations provided in Table 1 below, which compute the energy storage capacity gains enabled by hydrogen densification as a fraction of H2 energy (6.98%).

TABLE 1

| Capacity gains when using densified hydrogen | |
|---|---|
| Constants, etc. | MJ = 1,000,000J; kJ = 1000J; USD = A |
| Atm Pressure and Temperature | $p_{atm} := 101325$ Pa; $T_{env} := 300$K |
| Density of SV H2 @ atm | $\rho_{H2.SV} := PropsSI\left(D, P, \frac{p_{atm}}{Pa}, Q, 1, H2\right)\frac{kg}{m^3} = 1.332\frac{kg}{m^3}$ |
| Enthalpy of SV H2 @ atm | $h_{H2.SV} := PropsSI\left(H, P, \frac{p_{atm}}{Pa}, Q, 1, H2\right)\frac{J}{kg} = 448.711\frac{kJ}{kg}$ |
| Density of SL H2 @ atm | $\rho_{H2.SL} := PropsSI\left(D, P, \frac{p_{atm}}{Pa}, Q, 0, H2\right)\frac{kg}{m^3} = 70.848\frac{kg}{m^3}$ |
| Enthalpy of SL H2 @ atm | $h_{H2.SL} := PropsSI\left(H, P, \frac{p_{atm}}{Pa}, Q, 0, H2\right)\frac{J}{kg} = 3.715 \times 10^{-9}\frac{kJ}{kg}$ |
| Temperature of SL H2 @ atm | $T_{H2.SL} := PropsSI\left(T, P, \frac{p_{atm}}{Pa}, Q, 0, H2\right)K = 20.369$ K |
| Temperature of Densified H2 | $T_{den} := 12.3$K [lowest temp from CoolProp- conservative estimate] |
| Density of Densified H2 @ atm | $\rho_{H2.den} := PropsSI\left(D, P, \frac{p_{atm}}{Pa}, T, \frac{T_{den}}{K}, H2\right)\frac{kg}{m^3} = 78.393\frac{kg}{m^3}$ |
| Enthalpy of Densified H2 @ atm | $h_{H2.den} := PropsSI\left(H, P, \frac{p_{atm}}{Pa}, T, \frac{T_{den}}{K}, H2\right)\frac{J}{kg} = -64.458\frac{kJ}{kg}$ |
| Volume of LH2 Tank | $V_{tank} := 400{,}000$ gal $= 1514.165$ m$^3$ <br> $R_{tank} := \sqrt[3]{\frac{3}{4} \cdot \frac{1}{\pi} \cdot V_{tank}} = 7.124$ m |
| Mass of LH2 in the Tank <br> Thermal Energy Required to Densify | $m_{LH2} := V_{tank} \cdot \rho_{H2.SL} = 1.073 \times 10^5$ kg <br> $Q_{den} := m_{LH2}(h_{H2.SL} - h_{H2.den}) = 1.921 \cdot$ MW $\cdot$ hr |
| Percentage Loss | $k_{loss} := \frac{0.375\%}{day}$ |
| Wattage Loss | $Q_{loss} := m_{LH2} \cdot k_{loss} \, (h_{H2.SL} - h_{H2.den}) = 2.089$ kW |
| Equivalent Period of Warming | $t_{loss} := \frac{Q_{den}}{Q_{loss}} = 38.307$ day |
| COP of Cryoplant | $COP := \frac{T_{env} - T_{den}}{T_{den}} \cdot \frac{1}{30\%} = 77.967$ |
| Nominal Cryoplant Power <br> Electrical Energy Required to Densify | $P_{cryo} := COP \cdot Q_{loss} = 162.892$ kW <br> $E_{total} := P_{cryo} \cdot t_{loss} = 6.24$ MW $\cdot$ day |
| H2 Energy Density | $e_{H2} := 120\frac{MJ}{kg}$ |

TABLE 1-continued

Capacity gains when using densified hydrogen

| | |
|---|---|
| Energy in a Full Tank | $E_{H2} := m_{LH2} \cdot e_{H2} \cdot 60\% = 89.397$ MW · day |
| Energy Storage as a Fraction of H2 Energy | $\dfrac{E_{total}}{E_{H2}} = 6.98\%$ |

Such densification may allow the cryogen to remain stored without boil-off losses for at least a time period during non-operation of the cryoplant 20A. Such densification may at least partially reduce subsequent power requirements for the cryoplant to maintain the storage of the cryogen within the cryogen storage device 10 without boil-off losses (e.g., for at least a period of time, reducing the amount of cryoplant operating time needed to maintain storage of the cryogen without boil-off losses).

Figure 6:
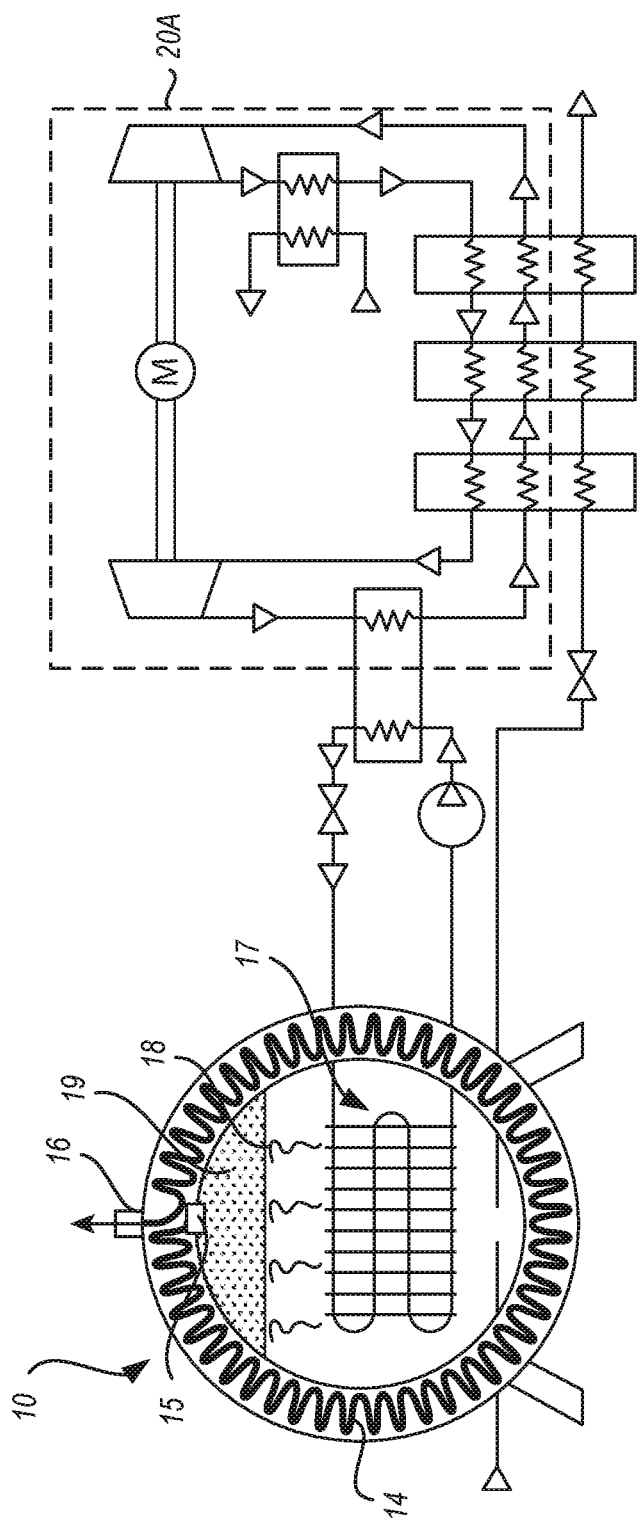
FIG. 6 illustrates an example storage operational mode of a cryogenic energy storage system.

FIG. 6 illustrates an example passive storage operational mode of a cryogenic energy storage system. In some embodiments, during a passive storage operational mode, the cryoplant 20A will be in a state of non-operation. Whether the cryoplant 20A is in a state of non-operation may be determined and controlled by the control system 22. For example, the cryoplant 20A may be in a state of non-operation due to a cost of electricity that is too high. Additionally, and/or alternatively, the cryoplant 20A may be non-operational due an exhaustion and/or unavailability of power.

In some instances, it may be preferable or necessary to configure the cryogen storage device 10 to allow for boil-off losses, such as where the cost of boil-off loss (e.g., the cost of cryogen for replacing boiled-off cryogen) is favorable relative to the cost of electricity (e.g., during peak hours). The vaporized cryogen 19 may slowly vent out of vapor vent 15, through the vapor path 14, and out the gaseous vent 16 (the pathway for the vaporized cryogen being shown in FIG. 6 by bolded lines). Liquid cryogen 18 can be replenished (e.g., via purchase or liquefaction).

Figure 7:
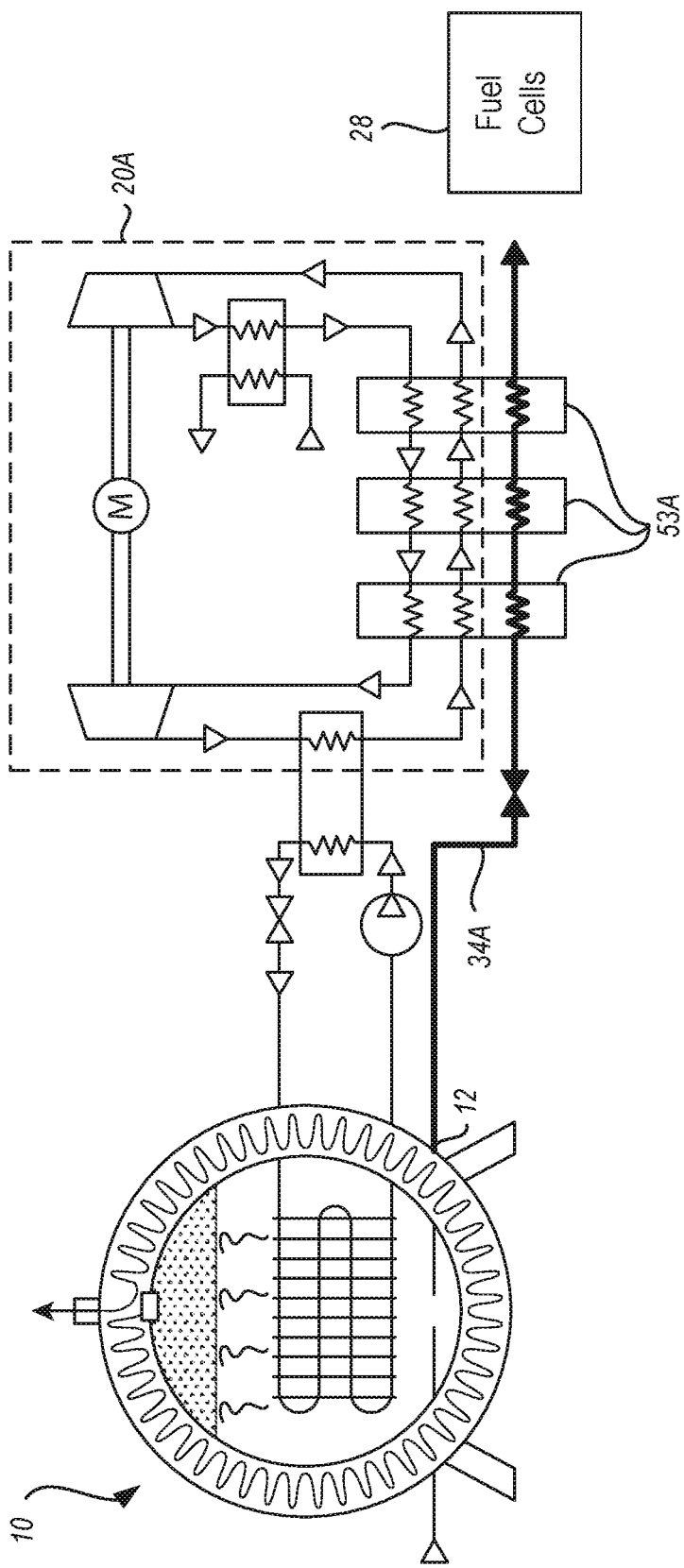
FIG. 7 illustrates an example fuel cell operational mode of a cryogenic energy storage system.

FIG. 7 illustrates an example fuel cell or power backup operational mode of a cryogenic energy storage system that recuperates waste cold. As illustrated in the example of FIG. 7, the cryoplant 20A is a reverse Brayton-turbo cycle. Liquid cryogen is withdrawn from the cryogen withdrawal port 12. The withdrawn cryogen is routed along fuel delivery path 34A (indicated in FIG. 7 with bolded lines), which extends from the cryogen withdrawal port 12 to one or more fuel cells 28. The one or more fuel cells 28 are configured to receive the cryogen and be used as power backups when grid electricity is unavailable. For example, the one or more fuel cells may provide power to one or more data centers 30 (see, for example, FIG. 1A) and/or the cryoplant 20A.

In the example of FIG. 7, the fuel delivery path 34A is in thermal communication with the cryoplant 20A via a set of heat exchangers 53A of the cryoplant 20A to facilitate waste cold recovery (e.g., cold generated by gasification of cryogen along the fuel delivery path 34A is captured by the set of heat exchangers 53A to at least partially improve operational efficiency of the cryoplant 20A).

For example, when the cryoplant 20A is subsequently operated, the cryoplant 20A starts in a colder state than if the set of heat exchangers 53A of the cryoplant 20A had not recovered the generated waste cold. In some instances, by starting in a colder state, the cryoplant 20A may operate more efficiently and, beneficially, requires less power to operate.

Whether the cryogenic energy storage system enters the fuel cell or power backup operational mode may be controlled by the control system 22 (e.g., by processing and/or evaluating at least one operational cost metric, as discussed herein).

Figure 8:
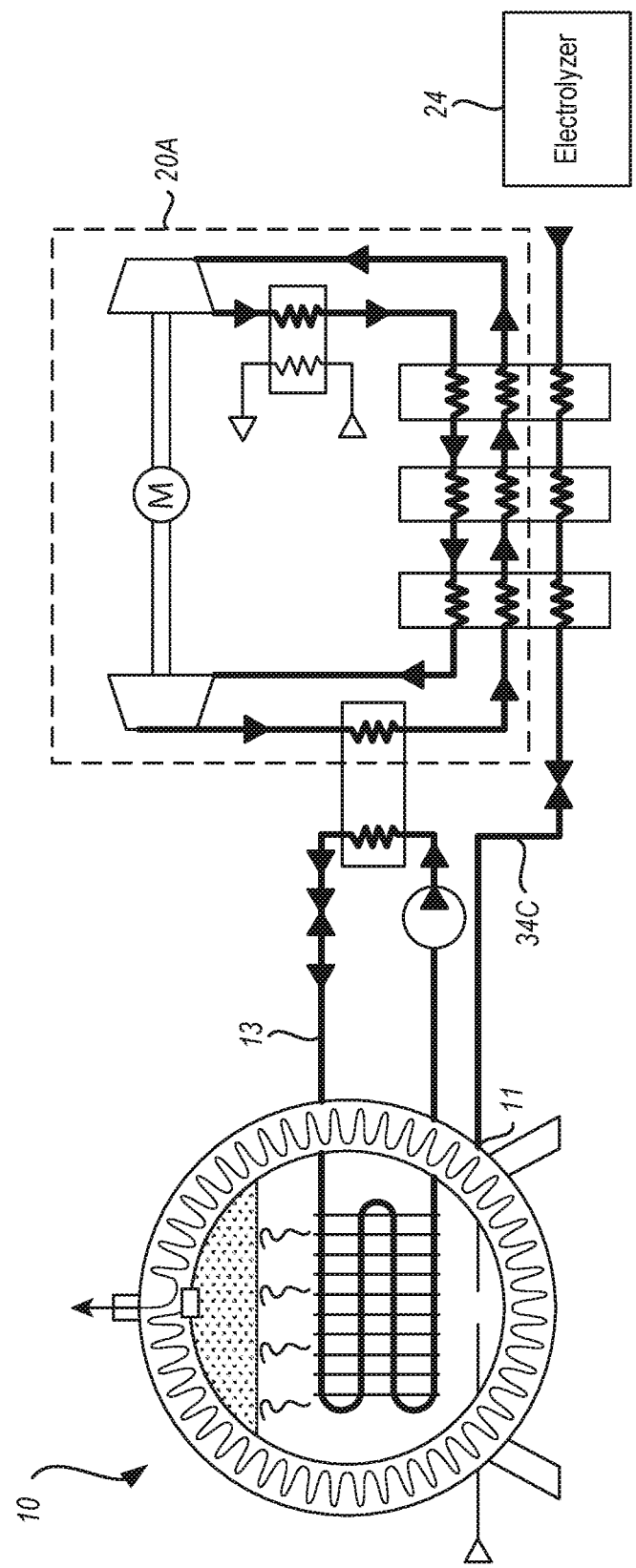
FIG. 8 illustrates an example liquefaction operational mode of a cryogenic energy storage system.

FIG. 8 illustrates an example liquefaction operational mode of a cryogenic energy storage system. The control system 22 may determine whether to implement the liquefaction operational mode according to at least one operational metric. For example, when energy costs are low or negative, it may be prudent to utilize power from the grid to liquify cryogen to be stored in the cryogen storage device 10.

As illustrated in the example of FIG. 8, an electrolyzer 24 supplies gaseous cryogen (or gaseous cryogen pre-cursor) via fuel delivery path 34C. The fuel delivery path 34C extends from the electrolyzer 24 to a cryogen inlet port 11 of the cryogen storage device 10. The cryogen inlet port 11 may be the same port as the cryogen withdrawal port 12 (see FIG. 7). Alternatively, the cryogen inlet port 11 may be different than the cryogen withdrawal port 12 (see FIG. 2). In some embodiments, fuel delivery path 34C is the same fuel delivery path 34A illustrated in FIG. 7. In some embodiments, fuel delivery path 34C may be different than the fuel delivery path 34A of FIG. 7.

The supplied gaseous cryogen from the electrolyzer 24 is cooled and liquified via operation of the cryoplant. For example, FIG. 8 shows the fuel delivery path 34C as interacting with the set of heat exchangers 53A of the cryoplant 20A to facilitate initial cooling of the gaseous cryogen prior to entry of the cryogen into the cryogen storage device 10. The cryogen is further cooled and/or liquefied within the cryogen storage device 10 via operation of the subcooling loop 13 of the cryogen storage device 10 and the cryoplant 20A (the movement of working fluid and gaseous cryogen is indicated in FIG. 8 by bolded lines). The liquified cryogen is stored in the cryogen storage device 10. The subcooling loop 13 of the cryogen storage device is in thermal communication with the cryoplant 20A. As illustrated, the cryoplant is a reverse Brayton-turbo cycle. During the liquefaction operational mode, the cryoplant 20A draws heat from the subcooling loop 13 via, for example, one or more heat exchangers. The transferred heat causes cooling and liquefaction of the gaseous cryogen as it is supplied to the cryogen storage device 10.

Figure 9:
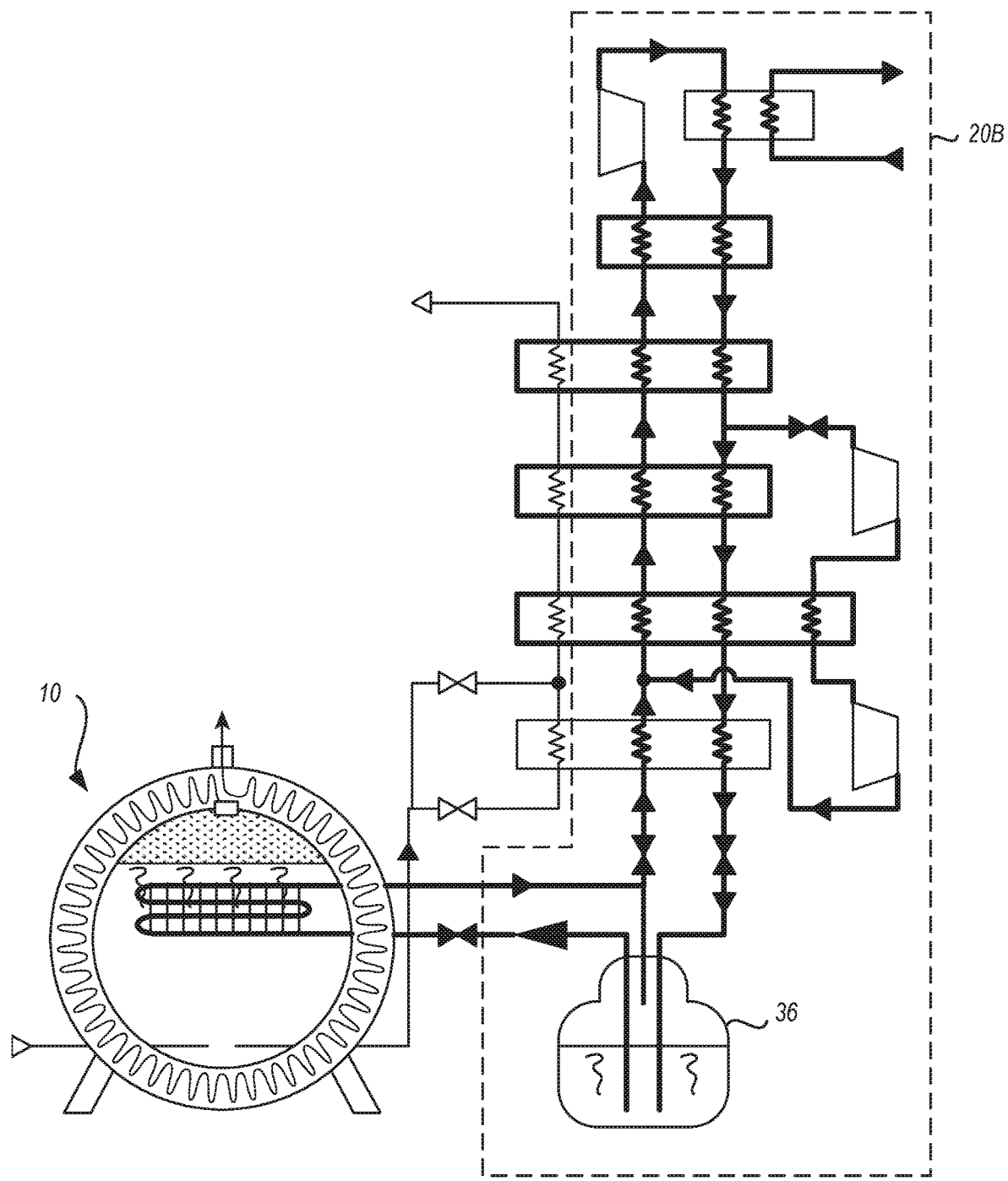
FIG. 9 illustrates another example cooling operational mode of a cryogenic energy storage system.

FIG. 9 illustrates another example cooling operational mode of a cryogenic energy storage system, conceptually similar to the example cooling operational mode discussed above with reference to FIG. 5. As illustrated, the cryoplant 20B of FIG. 9 is a Claude liquefaction cryoplant, which includes a working fluid dewar 36. The working fluid dewar 36 holds working fluid to be circulated through the cryoplant 20B in a refrigeration/cooling process. The working fluid circulated through the cryoplant 20B is also circulated through the subcooling loop 13 (the circulation of fluid being indicated in FIG. 9 via bolded lines). Circulation of the working fluid through the subcooling loop 13 provides the necessary cooling within the cryogen storage device 10 to liquify any vaporized cryogen contained inside the cryogen storage device 10. Additionally, and/or alternatively, the cooling may be used to densify liquid cryogen contained in the cryogen storage device 10 to at least partially solidify the liquid cryogen and form cryogen slush (at, for example, the subcooling loop). This in turn lowers the enthalpy of the cryogen in the tank and allows the tank to operate without active cooling and without boil-off losses until the cryogen temperature reaches the temperature of saturated vapor at atmospheric pressure. As discussed hereinabove, such densification may facilitate "virtual" storage of additional thermal energy within the cryogen itself, thereby increasing the overall storage capacity of the cryogen storage device.

Similar to the cryoplant 20A of FIG. 5, the cryoplant 20B may receive power from a power source 32, such as that illustrated in FIG. 1A.

Figure 10:
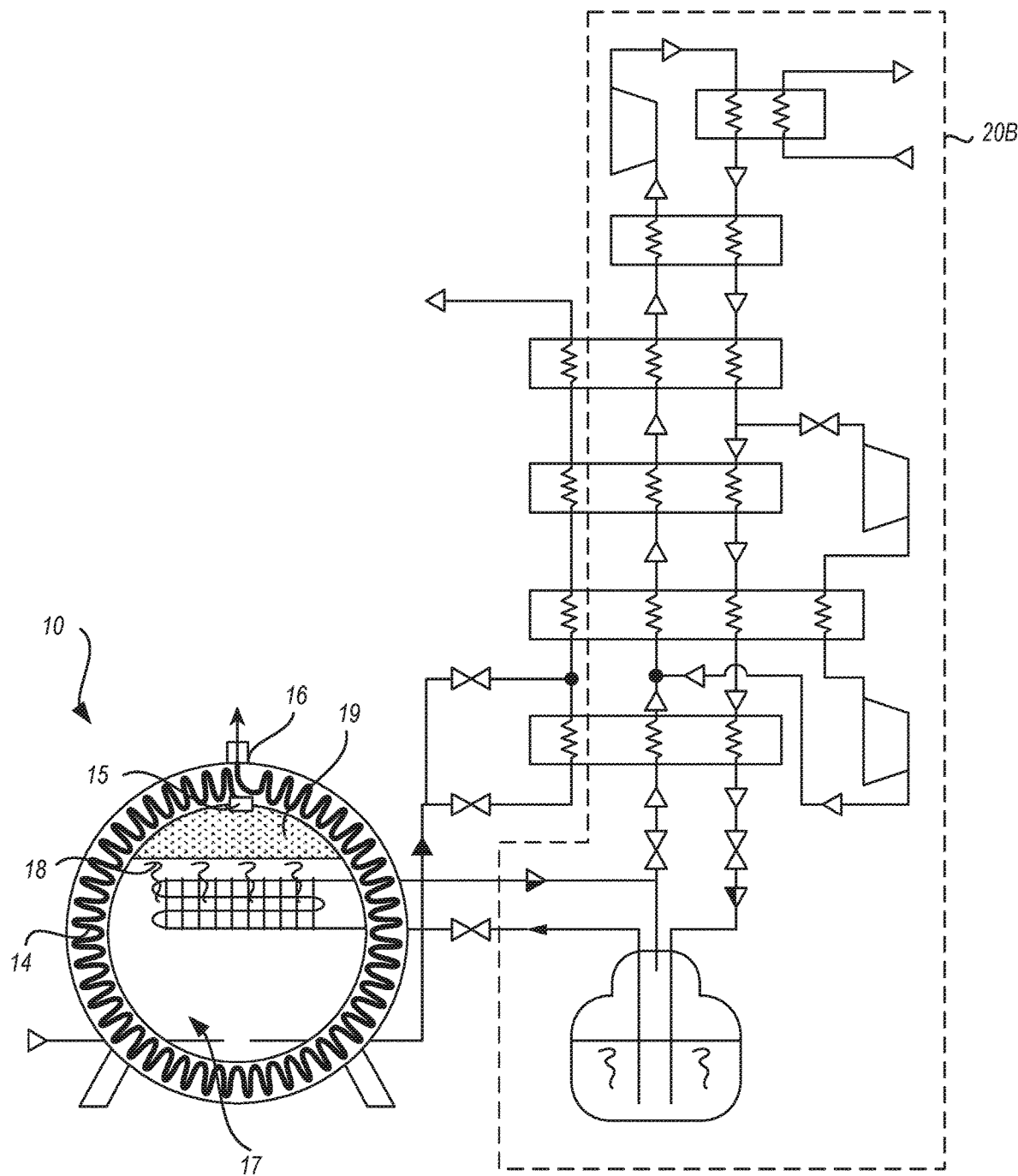
FIG. 10 illustrates another example storage operational mode of a cryogenic energy storage system.

FIG. 10 illustrates another example passive storage operational mode of a cryogenic energy storage system, conceptually similar to the passive storage operational mode discussed above with reference to FIG. 6.

Figure 11:
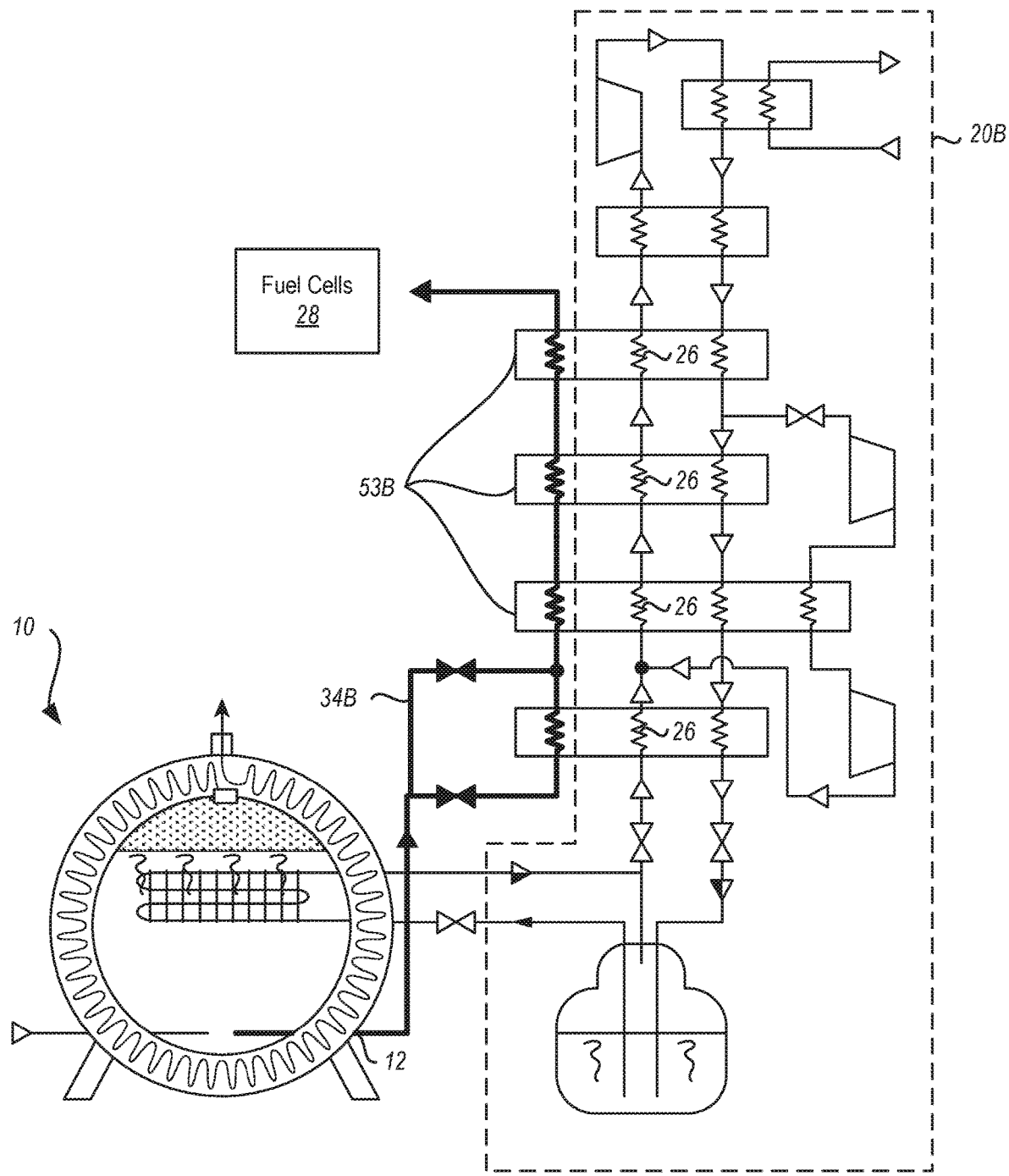
FIG. 11 illustrates another example fuel cell operational mode of a cryogenic energy storage system.

FIG. 11 illustrates another example fuel cell operational mode of a cryogenic energy storage system that recuperates waste cold, conceptually similar to the fuel cell operational mode discussed hereinabove with reference to FIG. 7. As illustrated in the example of FIG. 11, the cryoplant 20B is a Claude liquefaction cycle. Liquid cryogen is withdrawn from the cryogen withdrawal port 12. The withdrawn cryogen is routed or delivered along fuel delivery path 34B (indicated in FIG. 11 with bolded lines), which extends from the cryogen withdrawal port 12 to one or more fuel cells 28. The one or more fuel cells 28 are configured to receive the cryogen and be used as power backups when grid electricity is unavailable. For example, the one or more fuel cells may provide power to one or more data centers 30 (see, for example, FIG. 1A).

In the example of FIG. 11, the fuel delivery path 34B is in thermal communication with the cryoplant 20B via a set of heat exchangers 53B of the cryoplant 20B to facilitate waste cold recovery (e.g., cold generated by gasification of cryogen along the fuel delivery path 34B is captured by the set of heat exchangers 53B to at least partially improve operational efficiency of the cryoplant 20B). For example, when the cryoplant 20B is subsequently operated, the cryoplant 20B starts in a colder state than if the set of heat exchangers 53B of the cryoplant 20B had not recovered the generated waste cold. In some instances, by starting in a colder state, the cryoplant 20B operates more efficiently and, beneficially, requires less power to operate.

Figure 12:
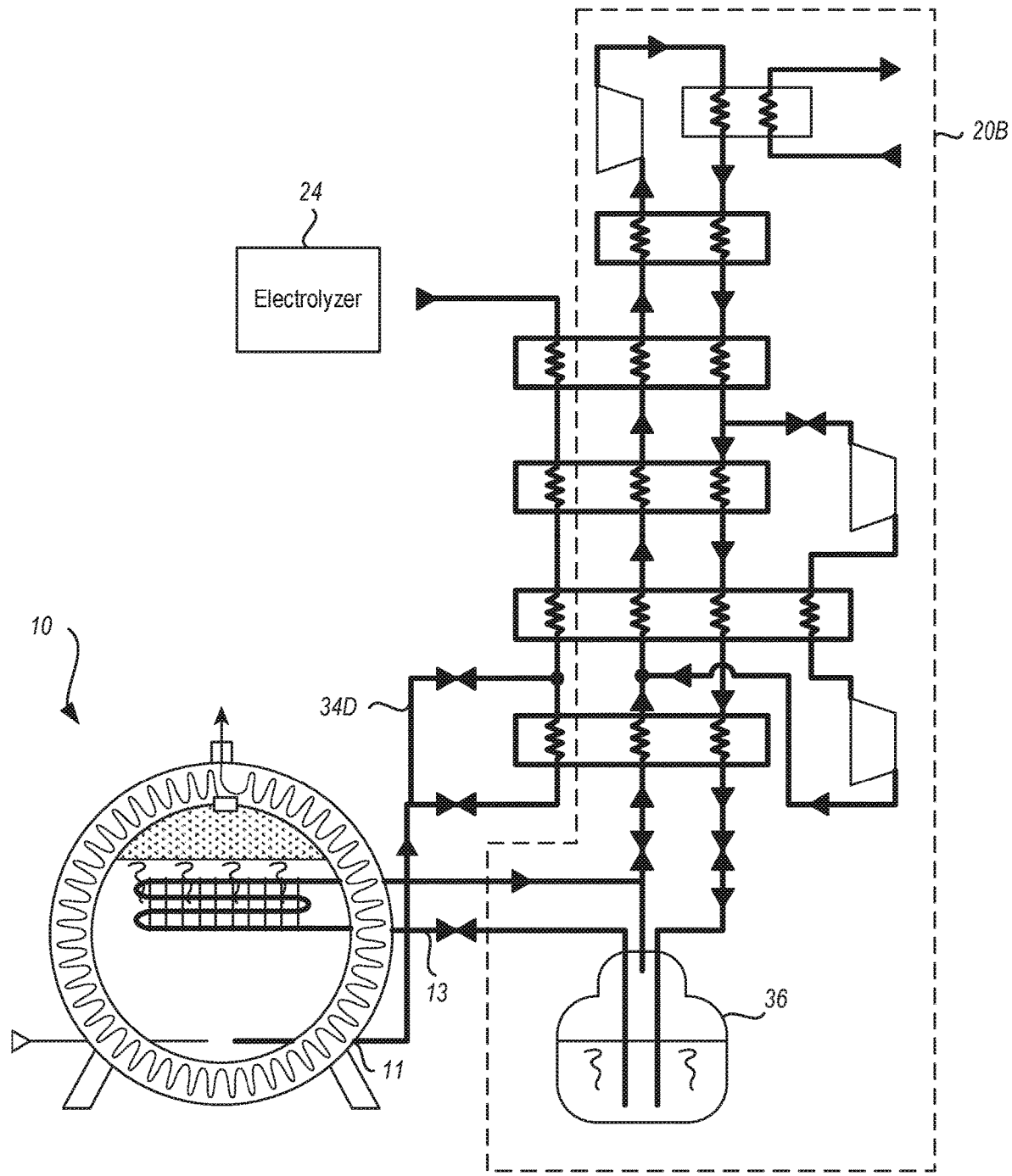
FIG. 12 illustrates another example liquefaction operational mode of a cryogenic energy storage system.

FIG. 12 illustrates another example liquefaction operational mode of a cryogenic energy storage system, conceptually similar to the liquefaction operational mode discussed hereinabove with reference to FIG. 8. As illustrated in the example of FIG. 12, an electrolyzer 24 supplies gaseous cryogen (or gaseous cryogen pre-cursor) via fuel delivery path 34D. The fuel delivery path 34D extends from the electrolyzer 24 to a cryogen inlet port 11 of the cryogen storage device 10 (the fuel delivery path 34D also interacts with the set of heat exchangers 53B of the cryoplant 20B). The cryogen inlet port 11 may be the same port as the cryogen withdrawal port 12 (see FIG. 11). Alternatively, the cryogen inlet port 11 may be different than the cryogen withdrawal port 12 (see FIG. 2). In some embodiments, fuel delivery path 34D is the same fuel delivery path 34B illustrated in FIG. 11. In some embodiments, fuel delivery path 34D may be different than the fuel delivery path 34B of FIG. 11.

The supplied gaseous cryogen from the electrolyzer 24 is liquified by operation of the cryoplant 20B, which cycles working fluid through the subcooling loop 13 to cause cooling and/or liquifying of the gaseous cryogen (the movement of working fluid and gaseous cryogen is indicated in FIG. 12 by bolded lines). The liquified cryogen is stored in the cryogen storage device 10. As illustrated, the cryoplant 20B is a Claude liquefaction cycle.

Figure 13:
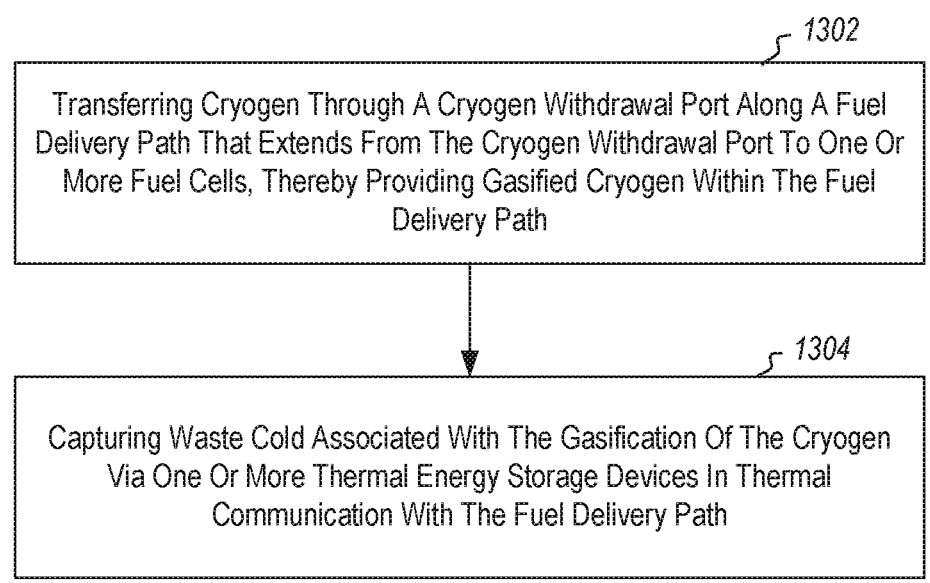
FIG. 13 illustrates a flowchart depicting acts associated with a fuel cell operational mode of a cryogenic energy storage system.

FIG. 13 illustrates a flowchart depicting acts associated with a fuel cell operational mode of a cryogenic energy storage system, as discussed herein. Act 1302 includes transferring cryogen through a cryogen withdrawal port along a fuel delivery path that extends from the cryogen withdrawal port to one or more fuel cells, thereby providing gasified cryogen within the fuel delivery path. The cryogen withdrawal port may be connected to a cryogen storage device. The fuel delivery path may extend from the cryogen withdrawal port to the one or more fuel cells. As the withdrawn cryogen flows along the fuel delivery path, the cryogen may gasify. Gasification of the cryogen may produce waste cold.

Act 1304 includes capturing waste cold associated with the gasification of the cryogen via one or more thermal energy storage devices in thermal communication with the fuel delivery path. The recovered waste cold may be utilized for any suitable purpose (e.g., to cool data center components). In some instances, the one or more thermal energy storage devices are associated with a cryoplant configured to actively cool contents of a cryogen storage device (e.g., the cryogen storage device connected to the cryogen withdrawal port), and the recovered waste cold may at least partially contribute improved operational efficiency of the cryoplant.

Figure 14:
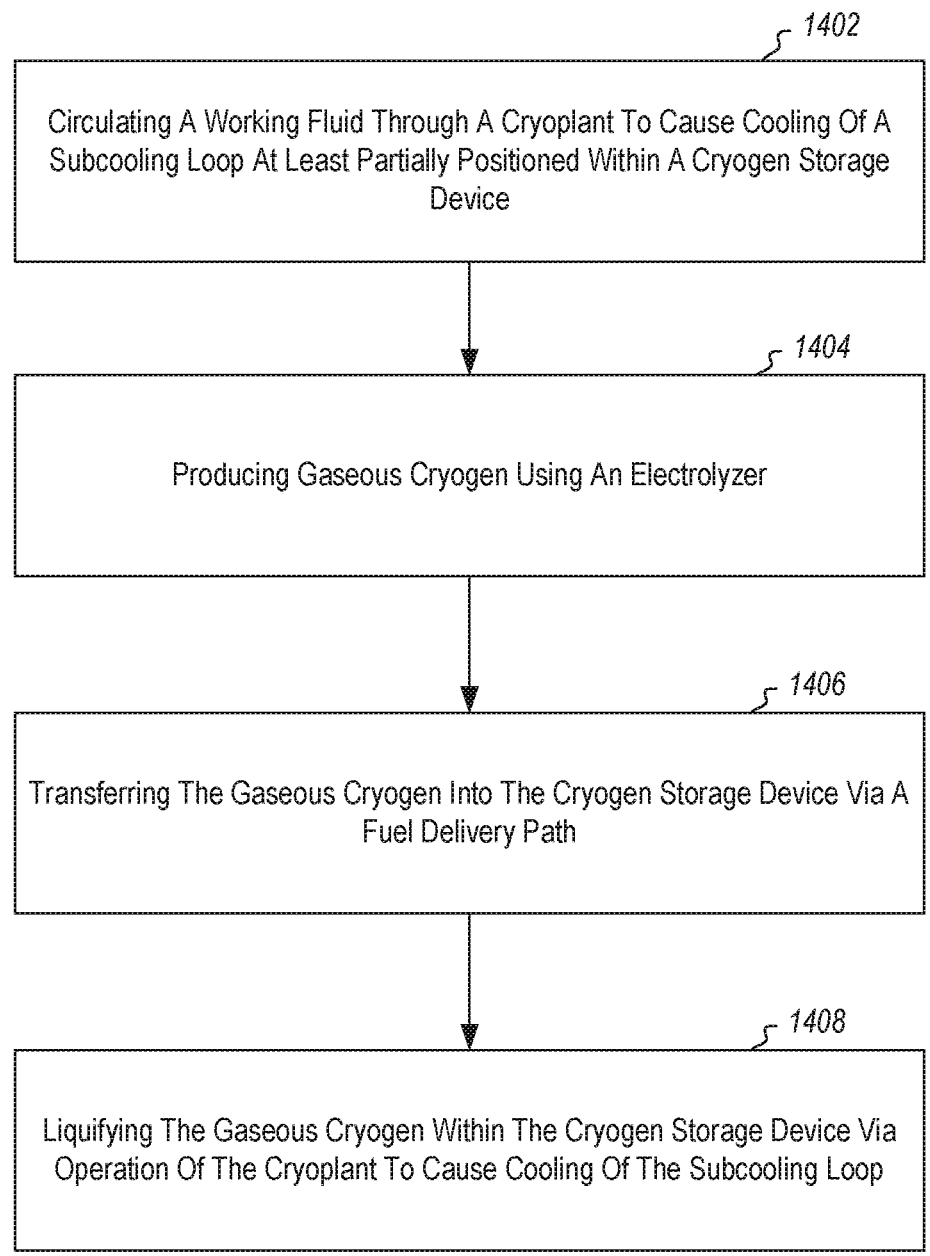
FIG. 14 illustrates a flowchart depicting acts associated with a liquefaction operational mode of a cryogenic energy storage system.

FIG. 14 illustrates a flowchart depicting acts associated with a liquefaction operational mode of a cryogenic energy storage system. Act 1402 includes circulating a working fluid through a cryoplant to cause cooling of a subcooling loop at least partially positioned within a cryogen storage device. Act 1404 includes producing gaseous cryogen using an electrolyzer. Act 1406 includes transferring the gaseous cryogen into the cryogen storage device via a fuel delivery path. Act 1408 includes liquifying the gaseous cryogen within the cryogen storage device via operation of the cryoplant to cause cooling of the subcooling loop. In some instances, the fuel delivery path is also a fuel delivery path associated with withdrawing cryogen from the cryogen storage device for operating one or more fuel cells. In some instances, the cryoplant is also configured to prevent boil-off losses to facilitate long-term storage of cryogen within the cryogen storage device. In some instances, the same cryogenic energy storage system is configured to perform both the acts shown in FIG. 13 and the acts shown in FIG. 14.

Operational Cost Metrics

As discussed herein, the control system 22 can process, analyze and/or evaluate at least one operational cost metric in determining and/or implementing one of a plurality of operational modes. In some embodiments, the control system 22 may include or comprise a computer or computer system (described in more detail hereinbelow). The operational cost metric may include or be based upon one or more of a cost of the cryogen, an energy usage for a data center, a cost of electricity, availability of an excess electrical energy, type of available energy, and a cost of boil-off losses.

For example, a cost of electricity may incorporate a time of day during which electricity is required, a utilities contract that may specify a cost of electricity (per kilowatt hour), a utilities contract that may specify an amount of electricity a cryoplant or data center is required to draw. The cost of electricity and/or the availability of an excess electrical energy may be based upon regularly updated data (e.g., a data stream provided or enabled by a utilities company) that is accessible to an entity associated with the operation of a cryogenic energy storage system as described herein. The operational cost metric may be based upon present/current operational cost(s) and/or anticipated operational cost(s) (e.g., according to the foregoing and/or other factors). For instance, a present operational cost may include the current cost of electricity based upon a live electrical cost data feed, whereas an anticipated operational cost may include an expected future cost or predicted future cost of electricity based upon an expected change to a utilities contract, an expected change in weather (e.g., affecting excess solar or wind), an expected change in data center power consumption, etc.

The type of available energy may incorporate whether the energy comes from renewable sources (whether directly connected renewable sources or grid-connected renewable sources). The type of available energy may also incorporate a predictive component or factor, such as weather data and/or a weather forecast. For example, when a day is forecasted to be sunny with no clouds, the control system 22 may obtain this information and configure or prepare to configure the cryoplant 20 to draw power from solar energy sources. The type of energy available may also incorporate a geographical element, such as whether a cryogenic energy storage system is located in a location with prevalent renewable energy (e.g., whether grid-connected or not) or in a location with scarce renewable energy.

The cost of cryogen may include shipping and/or piping costs to deliver cryogen to a cryogenic energy storage system. The shipping and/or piping costs may also incorporate weather data and/or weather forecasts. For example, when a day is predicted as being particularly hot (e.g., 100° F.), the cost of cryogen may be high due to potential cryogen losses during shipping.

The energy usage for a data center may incorporate the number of servers the data center is operating, queued computational tasks, current or expected traffic, etc. Additionally, or alternatively, the energy usage for a data center may incorporate the number of air conditioning units the data center utilizes to keep the servers at operational temperatures, and/or other data center aspects that consume power (e.g., security systems, failsafe systems such as fire extinguishing systems, etc.). The availability of an excess electrical energy from a grid may incorporate the number of users drawing power from the grid at any given period of time, the time of day, and/or based on other factors such as temperature.

Additional Terms & Definitions

While certain embodiments of the present disclosure have been described in detail, with reference to specific configurations, parameters, components, elements, etcetera, the descriptions are illustrative and are not to be construed as limiting the scope of the claimed invention.

Furthermore, it should be understood that for any given element of component of a described embodiment, any of the possible alternatives listed for that element or component may generally be used individually or in combination with one another, unless implicitly or explicitly stated otherwise.

In addition, unless otherwise indicated, numbers expressing quantities, constituents, distances, or other measurements used in the specification and claims are to be understood as optionally being modified by the term "about" or its synonyms. When the terms "about," "approximately," "substantially," or the like are used in conjunction with a stated amount, value, or condition, it may be taken to mean an amount, value or condition that deviates by less than 20%, less than 10%, less than 5%, less than 1%, less than 0.1%, or less than 0.01% of the stated amount, value, or condition. At the very least, and not as an attempt to limit the application of the doctrine of equivalents to the scope of the claims, each numerical parameter should be construed in light of the number of reported significant digits and by applying ordinary rounding techniques.

Any headings and subheadings used herein are for organizational purposes only and are not meant to be used to limit the scope of the description or the claims.

It will also be noted that, as used in this specification and the appended claims, the singular forms "a," "an" and "the" do not exclude plural referents unless the context clearly dictates otherwise. Thus, for example, an embodiment referencing a singular referent (e.g., "widget") may also include two or more such referents. Similarly, plural forms do not exclude singular referents.

It will also be appreciated that embodiments described herein may also include properties and/or features (e.g., ingredients, components, members, elements, parts, and/or portions) described in one or more separate embodiments and are not necessarily limited strictly to the features expressly described for that particular embodiment. Accordingly, the various features of a given embodiment can be combined with and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include such features.

Additional Implementation Details

The principles disclosed herein may be implemented in various formats. For example, the various techniques discussed herein may be performed as a method that includes various acts for achieving particular results or benefits. In some instances, the techniques discussed herein are represented in computer-executable instructions that may be stored on one or more hardware storage devices. The computer-executable instructions may be executable by one or more processors to carry out (or to configure a system to carry out) the disclosed techniques. In some embodiments, a system may be configured to send the computer-executable instructions to a remote device to configure the remote device for carrying out the disclosed techniques.

Systems and/or components of systems for implementing the disclosed embodiments (e.g., control system(s) 22, cryoplant(s) 20, cryogenic storage device(s) 10, data center(s) 30, etc.) may include various components or subcomponents, such as, by way of non-limiting example, processor(s), storage, sensor(s), actuator(s), I/O system(s), communication system(s), etc.

The processor(s) may comprise one or more sets of electronic circuitries that include any number of logic units, registers, and/or control units to facilitate the execution of computer-readable instructions (e.g., instructions that form a computer program). Such computer-readable instructions may be stored within storage. The storage may comprise physical system memory and may be volatile, non-volatile, or some combination thereof. Furthermore, storage may comprise local storage, remote storage (e.g., accessible via communication system(s) or otherwise), or some combination thereof.

In some implementations, the processor(s) may comprise or be configurable to execute any combination of software and/or hardware components that are operable to facilitate processing using machine learning models or other artificial intelligence-based structures/architectures. For example, processor(s) may comprise and/or utilize hardware components or computer-executable instructions operable to carry out function blocks and/or processing layers configured in the form of, by way of non-limiting example, single-layer neural networks, feed forward neural networks, radial basis function networks, deep feed-forward networks, recurrent neural networks, long-short term memory (LSTM) networks, gated recurrent units, autoencoder neural networks, variational autoencoders, denoising autoencoders, sparse autoencoders, Markov chains, Hopfield neural networks, Boltzmann machine networks, restricted Boltzmann machine networks, deep belief networks, deep convolutional networks (or convolutional neural networks), deconvolutional neural networks, deep convolutional inverse graphics networks, generative adversarial networks, liquid state machines, extreme learning machines, echo state networks, deep residual networks, Kohonen networks, support vector machines, neural Turing machines, and/or others.

In some instances, actions performable by a system or component thereof may rely at least in part on communication system(s) for receiving information from remote system(s), which may include, for example, separate systems or computing devices, sensors, and/or others. The communication system(s) may comprise any combination of software or hardware components that are operable to facilitate communication between on-system components/devices and/or with off-system components/devices. For example, the communications system(s) may comprise ports, buses, or other physical connection apparatuses for enabling data, information, and/or command communication with other devices/components (e.g., a control system 22 may comprise communication system(s) to enable data, information, and/or command communication with various other components of a cryogenic energy storage system). Additionally, or alternatively, the communications system(s) may comprise systems/components operable to communicate wirelessly with external systems and/or devices through any suitable communication channel(s), such as, by way of non-limiting example, Bluetooth, ultra-wideband, WLAN, infrared communication, and/or others.

A system may comprise or be in communication with sensor(s). Sensor(s) may comprise any device for capturing or measuring data representative of perceivable or detectable phenomena. By way of non-limiting example, the sensor(s) may comprise one or more light sensors/detectors, microphones, thermometers, barometers, magnetometers, accelerometers, gyroscopes, and/or others.

Furthermore, a system may comprise or be in communication with I/O system(s). I/O system(s) may include any type of input or output device such as, by way of non-limiting example, a touch screen, a mouse, a keyboard, a controller, a speaker and/or others, without limitation. For example, the I/O system(s) may include a display system that may comprise any number of display panels, optics, laser scanning display assemblies, and/or other components. One will appreciate, in view of the present disclosure, that the sensor(s) may, in some instances, be utilized as I/O system(s).

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are one or more "physical computer storage media" or "hardware storage device(s)." Computer-readable media that merely carry computer-executable instructions without storing the computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in hardware in the form of computer-executable instructions, data, or data structures and that can be accessed by a general-purpose or special-purpose computer.

A "network" may comprise one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code.

Disclosed embodiments may comprise or utilize cloud computing. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, wearable devices, and the like. The invention may also be practiced in distributed system environments where multiple computer systems (e.g., local and remote systems), which are linked through a network (either by hardwired data links, wireless data links, or by a combination of hardwired and wireless data links), perform tasks. In a distributed system environment, program modules may be located in local and/or remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Application-specific Standard Products (ASSPs), System-on-a-chip systems (SOCs), Complex Programmable Logic Devices (CPLDs), central processing units (CPUs), graphics processing units (GPUs), Programmable Logic Controllers (PLCs) and/or others.

As used herein, the terms "executable module," "executable component," "component," "module," or "engine" can refer to hardware processing units or to software objects, routines, or methods that may be executed on one or more computer systems. The different components, modules, engines, and services described herein may be implemented as objects or processors that execute on one or more computer systems (e.g., as separate threads).

One will also appreciate how any feature or operation disclosed herein may be combined with any one or combination of the other features and operations disclosed herein. Additionally, the content or feature in any one of the figures may be combined or used in connection with any content or feature used in any of the other figures. In this regard, the content disclosed in any one figure is not mutually exclusive and instead may be combinable with the content from any of the other figures.

The invention claimed is:

1. An energy storage system comprising:
   at least one cryogen storage device, wherein the at least one cryogen storage device comprises a subcooling loop, and wherein the at least one cryogen storage device is configurable to store a cryogen;
   a cryoplant configured to interact with the subcooling loop, wherein the cryoplant is also configured to interact with a power source, wherein the cryoplant and the subcooling loop comprise separate fluid circuits; and
   a control system configured to control the cryoplant and the at least one cryogen storage device according to a plurality of operational modes, the plurality of operational modes comprising: a cooling mode, a passive storage mode, a fuel cell backup mode, and a liquefaction mode, wherein the fuel cell backup mode comprises an interaction of the at least one cryogen storage device, the cryoplant, and one or more fuel cells, wherein the interaction of the at least one cryogen storage device, the cryoplant, and the one or more fuel cells comprises:
      drawing the cryogen from a cryogen withdrawal port of the at least one cryogen storage device; and
      delivering the withdrawn cryogen to the one or more fuel cells along a fuel delivery path that extends from the cryogen withdrawal port toward the one or more fuel cells, wherein gasification of the withdrawn cryogen occurs along the fuel delivery path, and wherein at least some waste cold thermal energy associated with the gasification is recovered by the cryoplant.

2. The energy storage system of claim 1, wherein the cooling mode comprises an interaction of the cryoplant and the at least one cryogen storage device that includes cycling working fluid through the cryoplant and the subcooling loop to facilitate cooling of cryogen stored within the at least one cryogen storage device.

3. The energy storage system of claim 2, wherein the cycling of the working fluid through the cryoplant and the subcooling loop causes densification or subcooling of the cryogen to store thermal energy within the at least one cryogen storage device.

4. The energy storage system of claim 3, wherein the densification or subcooling of the cryogen enables storage of the cryogen within the at least one cryogen storage device without boiloff losses for at least a time period associated with the passive storage mode.

5. The energy storage system of claim 4, wherein the passive storage comprises non-operation of the cryoplant for at least the time period.

6. The energy storage system of claim 1, wherein the liquefaction mode comprises:
   delivering gaseous cryogen pre-cursor to the at least one cryogen storage device via a cryogen inlet port of the at least one cryogen storage device; and
   cycling working fluid through the cryoplant and the subcooling loop to facilitate liquefaction of the gaseous cryogen pre-cursor within the at least one cryogen storage device.

7. The energy storage system of claim 1, wherein the cryogen comprises hydrogen, helium, nitrogen, methane, air, oxygen or natural gas.

8. An energy storage system comprising:
   at least one cryogen storage device that is configurable to store a cryogen, wherein the at least one cryogen storage device comprises a subcooling loop, wherein the at least one cryogen storage device comprises a vapor path that intervenes between an internal storage tank and a gaseous vent of the at least one cryogen storage device, and wherein the vapor path is configured to facilitate retention of cold associated with cryogen boil-off;
   a cryoplant configured to interact with the subcooling loop, wherein the cryoplant is also configured to interact with a power source; and
   a control system configured to control the cryoplant and the at least one cryogen storage device according to a plurality of operational modes, the plurality of operational modes comprising: a cooling mode, a passive storage mode, a fuel cell backup mode, and a liquefaction mode, wherein the fuel cell backup mode comprises an interaction of the at least one cryogen storage device, the cryoplant, and one or more fuel cells, wherein the interaction of the at least one cryogen storage device, the cryoplant, and the one or more fuel cells comprises:
      drawing the cryogen from a cryogen withdrawal port of the at least one cryogen storage device; and
      delivering the withdrawn cryogen to the one or more fuel cells along a fuel delivery path that extends from the cryogen withdrawal port toward the one or more fuel cells, wherein gasification of the withdrawn cryogen occurs along the fuel delivery path, and wherein at least some waste cold thermal energy associated with the gasification is recovered by the cryoplant.

9. The energy storage system of claim 8, wherein the cooling mode comprises an interaction of the cryoplant and the at least one cryogen storage device that includes cycling working fluid through the cryoplant and the subcooling loop to facilitate cooling of cryogen stored within the at least one cryogen storage device.

10. The energy storage system of claim 9, wherein the cycling of the working fluid through the cryoplant and the subcooling loop causes densification or subcooling of the cryogen to store thermal energy within the at least one cryogen storage device.

11. The energy storage system of claim 10, wherein the densification or subcooling of the cryogen enables storage of the cryogen within the at least one cryogen storage device without boiloff losses for at least a time period associated with the passive storage mode.

12. The energy storage system of claim 11, wherein the passive storage comprises non-operation of the cryoplant for at least the time period.

13. The energy storage system of claim 8, wherein the liquefaction mode comprises:
    delivering gaseous cryogen pre-cursor to the at least one cryogen storage device via a cryogen inlet port of the at least one cryogen storage device; and
    cycling working fluid through the cryoplant and the subcooling loop to facilitate liquefaction of the gaseous cryogen pre-cursor within the at least one cryogen storage device.

14. The energy storage system of claim 8, wherein the cryogen comprises hydrogen, helium, nitrogen, methane, air, oxygen or natural gas.

* * * * *